(12) United States Patent  
Sawai

(10) Patent No.: US 8,770,760 B2
(45) Date of Patent: Jul. 8, 2014

(54) IMAGE PROJECTION DEVICE

(75) Inventor: Yasumasa Sawai, Yamato Takada (JP)

(73) Assignee: Konica Minolta Opto, Inc., Tokyo (JP)

( * ) Notice: Subject to any disclaimer, the term of this patent is extended or adjusted under 35 U.S.C. 154(b) by 292 days.

(21) Appl. No.: 13/395,620

(22) PCT Filed: Sep. 11, 2009

(86) PCT No.: PCT/JP2009/065896
§ 371 (c)(1),
(2), (4) Date: Mar. 12, 2012

(87) PCT Pub. No.: WO2011/030436
PCT Pub. Date: Mar. 17, 2011

(65) Prior Publication Data
US 2012/0170001 A1  Jul. 5, 2012

(51) Int. Cl.
G03B 21/14  (2006.01)
G02F 1/00  (2006.01)

(52) U.S. Cl.
USPC ............................................ 353/20; 348/771

(58) Field of Classification Search
USPC .............. 353/20; 349/5–10; 348/771, E5.142
See application file for complete search history.

(56) References Cited

U.S. PATENT DOCUMENTS 5,600,383 A * 2/1997 Hornbeck ...................... 348/771
5,967,635 A * 10/1999 Tani et al. ....................... 353/20

FOREIGN PATENT DOCUMENTS

JP  2000-330072  11/2000
JP  2001-091894  4/2001
JP  2004-239954  8/2004

* cited by examiner

Primary Examiner — Thanh Luu
Assistant Examiner — Renee Naphas
(74) Attorney, Agent, or Firm — Cozen O'Connor

(57) ABSTRACT

The rotation axis of each mirror of a DMD (4) defines an angle of 45° with respect to long and short sides of a rectangular image display area. A polarization conversion optical system (24) makes a polarization direction of light from a light source (1) arranged in one direction and projects the arranged light, and after total reflection from the critical surface (31b) of a TIR prism (3), the light is guided to the DMD (4). When the incident surface of the critical surface (31b) and the mirror incident surface of the DMD (4) are in parallel with each other, a PBS prism array of the polarization conversion optical system (24) carries out the polarization and separation of the light from the light source (1) in a direction corresponding to the long side direction of the image display area of the DMD (4) in the case of the separation of the light from the light source (1) into two linear polarizations having different polarization directions. A polarization control means makes the two linear polarizations after the polarization and separation arranged in parallel or vertical polarization directions with respect to the incident surface of the critical surface (31b) and projects the same. Thus, a polarization condition of the light for illuminating the DMD (4) can be prevented from falling into disorder at a reflecting surface in the optical path, so that a light amount of the projection image can be prevented from reducing.

12 Claims, 10 Drawing Sheets

IMAGE PROJECTION DEVICE

RELATED APPLICATIONS

This application is a U.S. National Phase Application under 35 USC 371 of International Application PCT/JP2009/065896 filed Sep. 11, 2009.

TECHNICAL FIELD

The present invention is related to an image projection device which projects an image displayed on a display element onto a projection surface.

BACKGROUND ART

As a projector which projects an image that is displayed on a display element onto a projection surface such as a screen, one that employs a DMD as the display element for its fast switching speed has been in practical use. Recently, movies that can be enjoyed as stereoscopic images (hereinafter, 3D images) have been produced; movie theaters where such movies can be enjoyed have started to be set up, and projection TV sets for household use which are capable of displaying 3D images have started to be commercially available. A projector incorporating a DMD is commonly used as a 3D projector, because it displays images for a right eye and images for a left eye in a time-division manner, and a viewer can enjoy the thus displayed images as 3D images by wearing a pair of polarization glasses or a pair of shutter glasses.

Either pair of glasses mentioned above transmit circularly polarized light or linearly polarized light and direct the light to the right and left eyes of a viewer, and thus, if an image is projected in the form of randomly polarized light by using a projector incorporating a DMD, half or more of the amount of light is lost through the glasses. To prevent this, it is desirable to illuminate the DMD with illumination light having an aligned polarization direction, to obtain a projection image by using polarized light such that light is used efficiently. In this respect, for example, in a projector according to Patent Literature 1, a DMD is illuminated with light generated in the following manner: a polarization conversion optical system performs polarization separation on light from a light source, and then, one light is converted into light (linearly polarized light) having the same polarization direction as the other light.

Note that, in the projector according to Patent Literature 1, for an illumination system to effectively illuminate a light irradiation surface (an image display region) of the DMD, the illumination system including the polarization conversion optical system is disposed such that it is rotated about an optical axis by a predetermined angle (in this case, a polarization separation direction at the polarization conversion optical system corresponds to a long-side direction of the rectangular image display region of the DMD). As a result, linearly polarized light that has an aligned polarization direction and emerges from the polarization conversion optical system is obliquely incident on a reflection surface (for example, a dichroic surface or a reflection surface of a reflection mirror) in an optical path leading to the DMD, that is, the lineally polarized light is incident on the reflection surface such that the polarization direction thereof is in any state but being parallel or perpendicular to an incidence plane. Incidentally, the incidence plane is defined as a plane which, when a central light ray of a light beam travelling toward a center of the image display region of the DMD from the light source is incident on a surface, includes the central light ray which is incident on the surface and a normal line of the surface at the point where the central light ray is incident on the surface.

CITATION LIST

Patent Literature

Patent Literature 1: JP-A-2000-330072

SUMMARY OF INVENTION

Technical Problem

Generally, if linearly polarized light is obliquely incident on a reflection surface, the polarization state of the light is disturbed and the light is reflected from the reflection surface as, for example, elliptically polarized light. If the polarization state of the reflected light is disturbed in this way, it finally leads to reduction of the amount of light component having a required polarization. In this respect, in the projector according to Patent Literature 1, which is configured such that, as described above, linearly polarized light having a polarization direction which is neither parallel nor perpendicular to the incidence plane is incident on a reflection surface in an optical path leading from the illumination system to the DMD, the polarization state of light reflected by the reflection surface is disturbed by the reflection surface. Thus, the light which illuminates the DMD is no longer with a single linear polarization, and this reduces the amount of light component having a required polarization direction. As a result, when an image is projected by making use of polarized light, the amount of light of a projection image is disadvantageously reduced.

The present invention has been made to solve the above problem, and an object of the present invention is to provide an image projection device which is capable of preventing a polarization state of light for illuminating a DMD from being disturbed by a reflection surface in an optical path, to thereby prevent reduction of light amount of a projection image.

Solution to Problem

According to the present invention, an image projection device comprises: a polarization conversion optical system which converts light from a light source into a linearly polarized light having an aligned polarization direction; a display element which displays an image by modulating incident light; at least one reflection surface which reflects light from the polarization conversion optical system to direct the light to the display element; and a projection optical system which projects an image displayed on the display element onto a projection surface. Here, the display element comprises a digital micromirror device which has a rectangular image display region in which rotation axes of mirrors functioning as pixels each form an angle of 45° with respect to a long side and with respect to a short side of the image display region; when a central light ray of a light beam traveling from the light source toward a center of the image display region of the display element is incident on a surface, assuming that a plane including the central light ray incident on the surface and a normal line of the surface at a point where the central light ray is incident thereon is an incidence plane, an incidence plane of the at least one reflection surface and an incidence plane of a mirror at a center of the image display region of the display element are parallel or perpendicular to each other; and the polarization conversion optical system has: a polarization separation element which performs polarization separation to separate light from the light source into two linearly polarized lights having different polarization directions, and a direction of the polarization separation is a direction corresponding to a long-side direction of the image display region of the display element; and polarization control means which aligns polarization directions of the two linearly polarized lights into a polarization direction that is parallel or perpendicular to the incidence plane of the at least one reflection surface and outputs resulting linearly polarized lights.

In the image projection device according to the present invention, the polarization control means may comprise phase plates which are disposed at least one at an optical path of each of the two linearly polarized lights which result from the polarization separation performed by the polarization separation element.

In the image projection device according to the present invention, the phase plates may include: a first phase plate which is disposed at an optical path of one linearly polarized light of the two linearly polarized lights which result from the polarization separation performed by the polarization separation element; and a second phase plate which is disposed at optical paths of both of the two linearly polarized lights, the first phase plate converting the one linearly polarized light into a linearly polarized light having a same polarization direction as the other linearly polarized light of the two linearly polarized lights, and the second phase plate rotating the linearly polarized light which is incident thereon from the polarization separation element via the first phase plate and the other linearly polarized light which is incident thereon directly from the polarization separation element in a same direction such that a polarization direction is parallel or perpendicular to the incidence plane of the at least one reflection surface.

In the image projection device according to the present invention, the phase plates may include: a third phase plate which is disposed at an optical path of one linearly polarized light of the two linearly polarized lights which result from the polarization separation performed by the polarization separation element; and a fourth phase plate which is disposed at an optical path of the other linearly polarized light of the two linearly polarized lights, the third phase plate rotating the one linearly polarized light into a linearly polarized light having a polarization direction that is parallel or perpendicular to the incidence plane of the at least one reflection surface, and the fourth phase plate rotating the other linearly polarized light into a linearly polarized light having a same polarization direction as the linearly polarized light obtained by the third phase plate rotating the one linearly polarized light.

In the image projection device according to the present invention, the phase plates may include: a fifth phase plate which is disposed at an optical path of one linearly polarized light of the two linearly polarized lights which result from the polarization separation performed by the polarization separation element; a sixth phase plate which is disposed at an optical path of the other linearly polarized light of the two linearly polarized lights; and a seventh phase plate which is disposed at optical paths of both of the two linearly polarized lights, the fifth phase plate performing conversion of the one linearly polarized light into a circularly polarized light, the sixth phase plate performing conversion of the other linearly polarized light into a circularly polarized light which has a same rotation direction as the circularly polarized light which results from the conversion performed by the fifth phase plate; and the seventh phase plate converting the circularly polarized light which results from the conversion performed by the fifth phase plate into a first linearly polarized light and converting the circularly polarized light which results from the conversion performed by the sixth phase plate into a second linearly polarized light, the first and second linearly polarized lights having a same polarization direction which is parallel or perpendicular to the incidence plane of the at least one reflection surface.

In the image projection device according to the present invention, the polarization separation element may be a plate on a front side of which a wire grid is formed by arranging metal wires to be equally spaced from each other, and on a back side of which a reflection surface is formed such that the polarization separation element reflects linearly polarized light that is included in light incident on the wire grid and whose polarization direction is parallel to the wires to the polarization control means, while the polarization separation element transmits linearly polarized light that is included in the light incident on the wire grid and whose polarization direction is perpendicular to the wires such that the linearly polarized light is reflected by the reflection surface to the polarization control means.

The image projection device according to the present invention may further comprise an integrator optical system which uniformizes a light amount distribution of light from the light source and forms an illumination light beam having a shape that is similar to a shape of the rectangular image display region of the digital micromirror device.

The image projection device according to the present invention may further comprise a critical angle prism having a critical surface which totally reflects illumination light to the display element and transmits image light from the display element such that an incidence plane of the critical surface and incidence planes of the mirrors of the digital micromirror device are parallel to each other, and such that the at least one reflection surface includes the critical surface.

In the image projection device according to the present invention, light that passes through the critical surface is preferably P-polarized light.

In the image projection device according to the present invention, the critical surface is preferably a non-coated surface or a surface that is coated with a single-layer protection coat.

In the image projection device according to the present invention, three display elements may be provided as the display element corresponding to three different colors, the image projection device may further comprise a color prism which is disposed at optical paths between the critical angle prism and the display elements such that the color prism separates light from the critical angle prism into light of the three different colors and direct the light of each of the three different colors to a corresponding one of the display elements, and such that the color prism combines light reflected from the display elements into a same optical path, and the rotation axes of the mirrors of the display elements may be parallel to a plane that is parallel to a normal line of each of color separation surfaces of the color prism.

The image projection device according to the present invention may further comprise color selective polarization conversion means which converts a polarization direction of linearly polarized light that enters the color prism from the critical angle prism into a direction that is perpendicular to another polarization direction selectively according to wavelength. Here, the color prism may have two color separation surfaces as the color separation surface such that the two color separation surfaces reflect light of colors which are different from each other while the two color separation surfaces each transmit light of a remaining color, and such that the color selective polarization conversion means direct light of a color that passes through both of the two color separation surfaces to be incident on the two color separation surfaces as substantially P-polarized light while the color selective polarization conversion means directs light of a remaining color to be incident on the two color separation surfaces as substantially S-polarized light.

Advantageous Effects of Invention

According to the present invention, light from a light source is converted into linearly polarized light having a polarization direction aligned in one direction by polarization conversion optical system, and is then reflected by at least one reflection surface to be directed to a display element. Here, a critical surface of a critical angle prism and a color separation surface (a dichroic surface), for example, can be assumed as the at least one reflection surface. In the display element, an image is displayed by modulating incident light, and the thus displayed image is projected via a projection optical system onto a projection surface.

Here, in a configuration where (1) the display element is a DMD in which rotation axes of mirrors each form an angle of 45° with respect to a long side and a short side of an image display region, (2) the at least one reflection surface and a mirror of the DMD located in a center of the image display region are arranged in such a positional relationship that their incidence planes are parallel or perpendicular to each other, and (3) a polarization separation element separates, in a direction corresponding to a long-side direction of the image display region of the display element, the light from the light source into two linearly polarized lights which are different from each other in polarization direction, polarization directions of the two linearly polarized lights soon after being separated from each other are neither parallel nor perpendicular to the incidence plane of the reflection surface mentioned above (for example, the polarization directions form an angle of ±45° with respect to the incidence plane).

However, the two linearly polarized lights separated from each other by the polarization separation element are outputted from polarization control means after having their polarization directions aligned parallel or perpendicular to the incidence plane of the reflection surface, and this helps prevent disturbance of polarization state of the linearly polarized light when reflected by the reflection surface. And, with the feature described in (2) above, it is possible to illuminate the mirror located in the center of the image display region with light having a single linear polarization that is parallel or perpendicular to the incidence plane. If the mirror located in the center of the image display region is illuminated in this way, it can be said that the other mirrors are also virtually illuminated with light with a single linear polarization whose polarization state is not disturbed. Thus, it is possible to project an image onto the projection surface without degrading the efficiency of using light reflected from the mirrors (that is, without reducing the amount of light component of a required polarization direction). That is, it is possible to avoid reduction of the light amount of a projection image when an image is projected by making use of polarized light. Also, with the feature described in (3) above, polarization states can be aligned efficiently, which contributes to achieve increased light amount of the projection image.

DESCRIPTION OF EMBODIMENTS

Embodiment 1

Hereinafter, an embodiment of the present invention will be described with reference to the relevant drawings.

(1-1. Overall Configuration)

Figure 1:
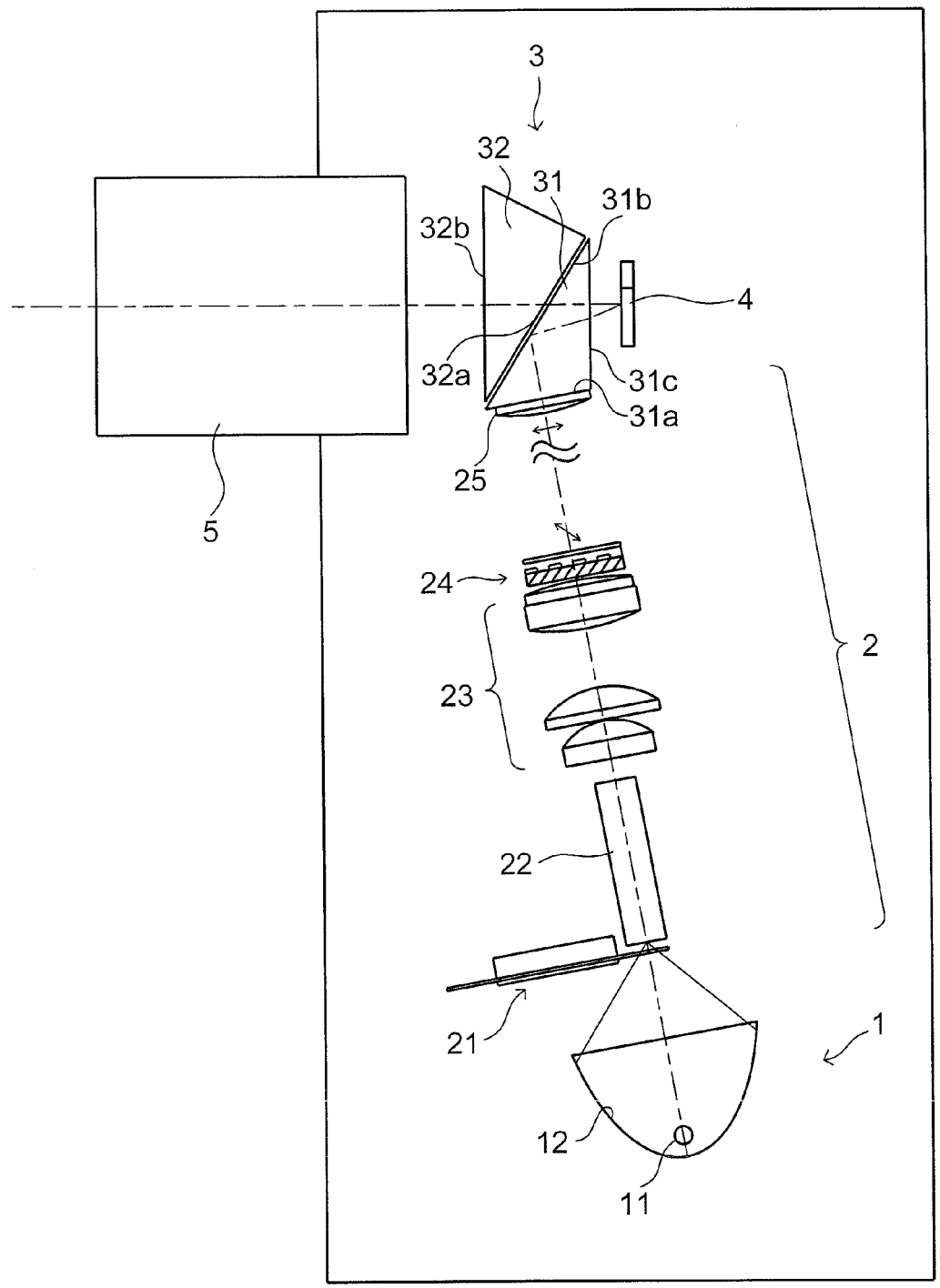
FIG. 1 A cross-sectional view schematically showing a configuration of an image projection device according to an embodiment of the present invention.

FIG. 1 is a cross-sectional view schematically showing a configuration of an image projection device according to this embodiment. This image projection device has: a light source 1, an illumination optical system 2, a TIR prism 3, a DMD 4, and a projection optical system 5. Here, a polarization separation direction at the illumination optical system 2 is actually tilted by 45°, and is thus skew, with respect to a later-described incidence plane of a critical surface 31b of the TIR prism 3, but in FIG. 1, in order to make the description easier to understand, the incidence plane and the polarization separation direction are indicated in a same plane.

In this configuration, light emitted from the light source 1 enters the TIR prism 3 via the illumination optical system 2; the light is totally reflected at the TIR prism 3, and is then incident on the DMD 4. The light incident on the DMD 4 is modulated there to then emanate therefrom as image light, which passes through the TIR prism 3 to be directed via the projection optical system 5 to a screen serving as a projection surface. By the projection optical system 5, an image displayed on the DMD 4 is projected onto the screen as an enlarged image. Here, the projection surface may be a wall.

At this time, with the DMD 4 illuminated with light resulting from conversion of randomly polarized light into linearly polarized light through the polarization conversion optical system 24, images for a right eye (right-eye images) and images for a left eye (left-eye images) are sequentially displayed on the DMD 4 in a time-division manner, and projected onto the screen. In this case, a viewer can enjoy 3D images by viewing the projection images through a pair of shutter glasses which alternately transmit the linearly polarized light of the right-eye images and the linearly polarized light of the left-eye images in synchronization with the time-division display. Hereinafter, detailed descriptions will be given of each configuration.

For convenience of description, terms used in the descriptions hereinafter are defined as follows. Assuming that a central light ray of a light beam travelling from the light source 1 toward a center of a rectangular image display region of the DMD 4 is incident on any surface in an optical path, a plane including the central light ray which is incident on the surface and a normal line of the surface at the point at which the central light ray is incident thereon is an incidence plane. Linearly polarized light whose polarization direction is parallel to the incidence plane is P-polarized light, and linearly polarized light whose polarization direction is perpendicular to the incidence plane is S-polarized light. However, linearly polarized light having one polarization direction can be the P-polarized light in one case and can be the S-polarized light in another case, depending on which reflection surface (incidence plane) is selected as a basis. A surface of an optical member on which light is incident to pass through the optical member is referred to as a "light entrance surface" to be distinguished from the incidence plane, and a surface of the optical member from which light leaves the optical member is referred to as a "light exit surface".

(1-2. Light Source)

The light source 1 emits light for illuminating the DMD 4, and comprises a light emitting portion 11 and a reflector 12. The light emitting portion 11 comprises, for example, a discharge lamp that emits white light. The reflector 12 is a reflection plate which reflects light coming from the light emitting portion 11 to direct the light to the illumination optical system 2. The reflector 12 has a spheroidal reflection surface, and the light emitting portion 11 is disposed at one of focal positions of the reflector 12. Thus, the light from the light emitting portion 11 is reflected by the reflector 12 to be collected at the other focal position, and enters a rod integrator 22 via a later-described color wheel 21 of the illumination optical system 2.

(1-3. Illumination Optical System)

The illumination optical system 2 is an optical system that guides the light from the light source 1 to the DMD 4, and has the color wheel 21, the rod integrator 22, an illumination relay system 23, the polarization conversion optical system 24, and an entrance lens 25.

The color wheel 21 comprises a color filter which sequentially transmits light of R(red) color, light of G(green) color, and light of B(blue) color. By rotating the color wheel 21, it is possible to illuminate the DMD 4 with light whose color is sequentially changed in time, and thus, by displaying image data corresponding to each color on the DMD 4, it is possible to colorize the projection images.

The rod integrator 22 uniformizes a light amount distribution of the light from the light source 1 and outputs the resulting light. A cross-sectional shape of the rod integrator 22 is substantially similar to a shape of the rectangular image display region of the DMD 4. In this way, the rod integrator 22 forms an integrator optical system which forms an illumination light beam having a shape that is substantially similar to the shape of the rectangular image display region of the DMD 4.

A light entrance surface of the rod integrator 22 and a pupil plane of the illumination relay system 23 are substantially conjugate to each other. On the pupil plane of the illumination relay system 23, a plurality of secondary light source images are formed at positions in accordance with the number of times of reflection occurring inside the rod integrator 22, and a later-described PBS prism array 41 is disposed corresponding to the positions of the plurality of secondary light source images. Also, a light exit surface of the rod integrator 22 and the image display region of the DMD 4 are substantially conjugate to each other by the illumination relay system 23.

The illumination relay system 23 is an optical system that uniformly illuminates the DMD 4 by relaying an image formed on the light exit surface of the rod integrator 22 and projecting the image onto the DMD 4. The illumination relay system 23 comprises a plurality of lenses. By collecting light coming from the rod integrator 22 by the plurality of lenses, it is possible to improve the efficiency of using light.

The polarization conversion optical system 24 is an optical system that converts the light (randomly polarized light) received from the light source 1 into linearly polarized light having a uniformly aligned polarization direction and outputs resulting linearly polarized light; detailed description of the polarization conversion optical system 24 will be given later.

The entrance lens 25 is a lens for illuminating the DMD 4 in a substantially telecentric manner, and is disposed on a light entrance side of the TIR prism 3. Incidentally, instead of providing the entrance lens 25, a surface of the TIR prism 3 on the light entrance side may be formed as a curved surface so as to carry out the function of the entrance lens 25.

According to the above configuration of the illumination optical system 2, the light of each color entering the rod integrator 22 in a time-division manner from the light source 1 via the color wheel 21 is mixed through internal reflection, which occurs repeatedly inside the rod integrator 22, into light having a uniform light amount distribution, and resulting light leaves the rod integrator 22 from the light exit surface thereof. According to how many times the reflection is repeated inside the rod integrator 22, a plurality of secondary light source images are formed inside the illumination relay system 23, and by superposing these images on one another, it is possible to achieve illumination light having a uniform light amount distribution. The light emanating from the rod integrator 22 is directed to the DMD 4 via the illumination relay system 23, the polarization conversion optical system 24, the entrance lens 25, and the TIR prism 3. At this time, since the cross-sectional shape of the rod integrator 22 is substantially similar to the shape of the rectangular image display region of the DMD 4, light is directed to the DMD 4 not only uniformly but also efficiently. By illuminating the DMD 4 with light having a uniform light amount distribution as described above, it is possible to eliminate nonuniformity of light amount (brightness) from a projection image.

Furthermore, thanks to the polarization conversion optical system 24, both the illumination light for the DMD 4 and projection light are polarized light (for example, linearly polarized light), and this allows a viewer to enjoy 3D images via a pair of shutter glasses as mentioned above. Moreover, through the polarization conversion optical system 24, randomly polarized light is converted into linearly polarized light having an aligned polarization direction, and this makes it possible to obtain a projection image that suffers less from loss of light amount, and thus is visually brighter, than with a configuration in which only linearly polarized light having a predetermined polarization direction is extracted (by blocking linearly polarized light having the other polarization directions) to illuminate a display element and project an image therewith. That is, the polarization conversion optical system 24 makes it possible to project a bright image even with polarized light.

(1-4. TIR Prism)

The TIR prism 3 is a total reflection prism (a critical angle prism) having a critical surface 31b which totally reflects the illumination light to be directed to the DMD 4 and transmits image light (projection light) coming from the DMD 4. By bending the optical path of the illumination light by using the TIR prism 3, it is possible to achieve a compact image projection device. The image projection device of this embodiment has, in an optical path leading from the polarization conversion optical system 24 to the DMD 4, at least one reflection surface which directs light from the polarization conversion optical system 24 to the DMD 4 by reflecting the light, and the critical surface 31b is included in the at least one reflection surface.

The TIR prism 3 is formed by bonding two prisms 31 and 32 together with an air gap layer in between. The prism 31 has a first light entrance surface 31a, the critical surface 31b, and a first light exit surface 31c; the prism 32 has a second light entrance surface 32a and a second light exit surface 32b. The critical surface 31b of the prism 31 and the second light entrance surface 32a of the prism 32 are disposed facing each other with the air gap layer in between.

The illumination light coming from the illumination optical system 2 enters the prism 31 of the TIR prism 3 through the first light entrance surface 31a. The critical surface 31b of the prism 31 is disposed such that illumination light that is incident thereon as, for example, P-polarized light is totally reflected thereon; the illumination light reflected from the critical surface 31b leaves the prism 31 through the first light exit surface 31c to illuminate the DMD 4.

Also, ON light included in light reflected from the DMD 4 enters the projection optical system 5 again via the TIR prism 3, to be directed to the screen. More specifically, a light beam (projection light) reflected by pixels (mirrors) of the DMD 4 in a state of displaying an image enters the prism 31 again through the first light exit surface 31c of the prism 31, and reaches the critical surface 31b as P-polarized light. At this time, the projection light mentioned above is incident on the critical surface 31b at an angle that does not satisfy the total reflection condition, and thus, the projection light passes through the critical surface 31b, travels via the air gap layer, and enters the prism 32 through the second light entrance surface 32a, and then the projection light is directed to the screen via the second light exit surface 32b and the projection optical system 5. The projection light is projected in a state of linearly polarized light having a polarization direction that is at an angle of 45° with respect to the rectangular display surface (the screen).

In the TIR prism 3, the projection light from the DMD 4 is incident on the critical surface 31b at a very large incidence angle (for example, at an incidence angle of 32.5° in the prism 31 whose refractive index is 1.52) and thus passes therethrough; however, since the projection light passes through the critical surface 31b in the state of P-polarized light, it is possible to minimize reflectivity at the critical surface 31b. That is, in the case where the light that passes through the critical surface 31b is P-polarized light, less surface reflection (light amount loss due to reflection) occurs when the light passes through the critical surface 31b, and thus more efficient use of light can be made in comparison with a case where the light that passes through the critical surface 31b is S-polarized light. Incidentally, it is thanks to the polarization conversion optical system 24 which, as will be described later, causes linearly polarized light having a polarization direction that is parallel to the incidence plane of the critical surface 31b to be incident on the DMD 4 as the illumination light that the projection light (image light) can pass through the critical surface 31b as P-polarized light.

Figure 2:
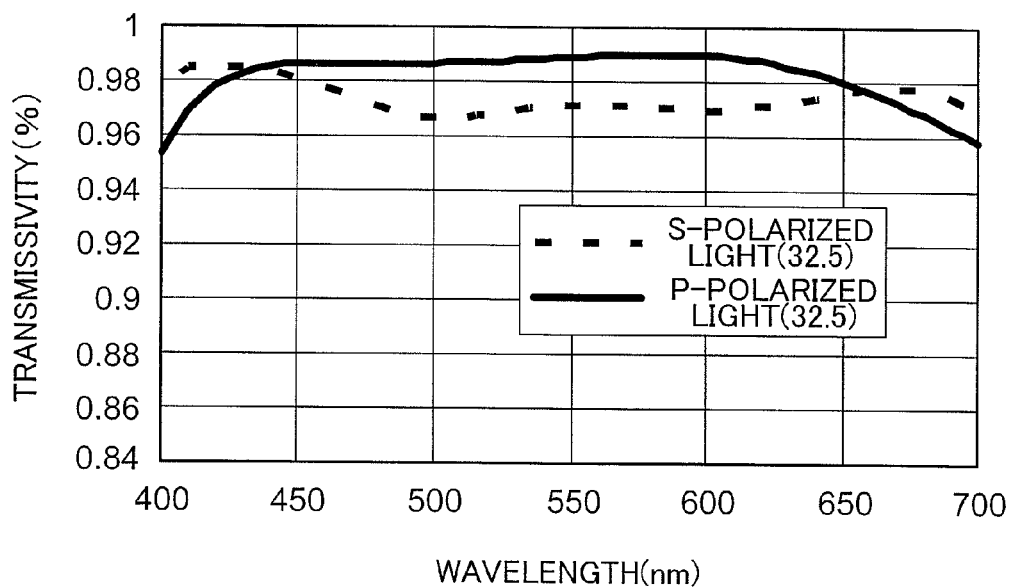
FIG. 2 A diagram for illustrating an optical characteristic of a typical antireflection coat.
Figure 3:
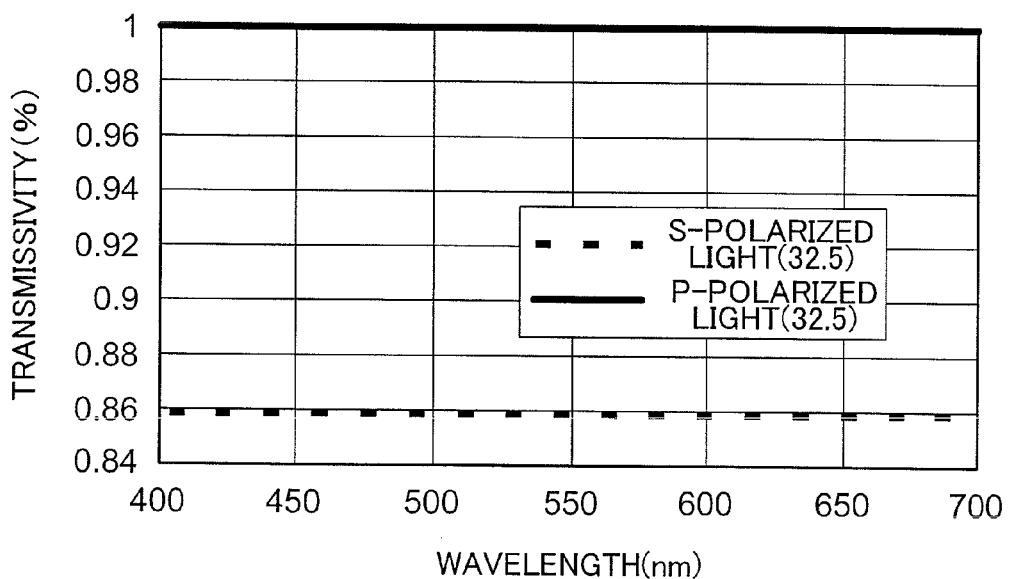
FIG. 3 A diagram for illustrating an optical characteristic of a critical surface of a TIR prism incorporated in the image projection device.

Also, since the light that passes through the critical surface 31b is P-polarized light, it is possible to obtain sufficiently high transmission efficiency even without applying an antireflection coat to the critical surface 31b, and thus cost cut can be achieved. Here, FIG. 2 shows an optical characteristic (transmission characteristic) of a typical antireflection coat (multi-layer film) in a case where light incident at an incidence angle of 32.5° in a medium whose refractive index is 1.52 travels from the medium into the air, and FIG. 3 shows an optical characteristic (transmission characteristic) of the critical surface 31b under the same condition. Note that, in this embodiment, the critical surface 31b is a non-coated surface on which no protection coat (optical thin film) is formed. As shown in FIG. 2, the typical antireflection coat has a lower reflectivity for P-polarized light than for S-polarized light; in contrast, as shown in FIG. 3, in a case where the critical surface 31b is a non-coated surface, the reflectivity for S-polarized light at the critical surface 31b is extremely high while that for P-polarized light is extremely low.

Thus, by forming the critical surface 31b as a non-coated surface, it is possible to reduce the cost thanks to the eliminated need for any antireflection coat, and also to improve the efficiency of using light thanks to the improved transmissivity for P-polarized light.

Also, in a case where a protection coat is formed such that the characteristic shown in FIG. 3 does not change much, by, for example, forming a single-layer protection coat on the critical surface 31b, it is possible to reduce the cost thanks to the reduced number of layers, and to improve the transmissivity for P-polarized light, in comparison with a case where a conventionally typical multi-layer antireflection coat is formed. Therefore, it can be said that the critical surface 31b may be formed either as a non-coated surface or as a surface that is coated with a single-layer protection coat. In particular, the latter case is advantageous in that weathering of glass surface can be prevented and thus high product quality can be ensured over a long period of time.

In the TIR prism 3, the projection light coming from the DMD 4 passes through two interfaces (the critical surface 31b and the second light entrance surface 32a) at a large incidence angle, and therefore, as described above, even a minor improvement of transmissivity has a large positive effect.

(1-5. DMD)

Figure 4:
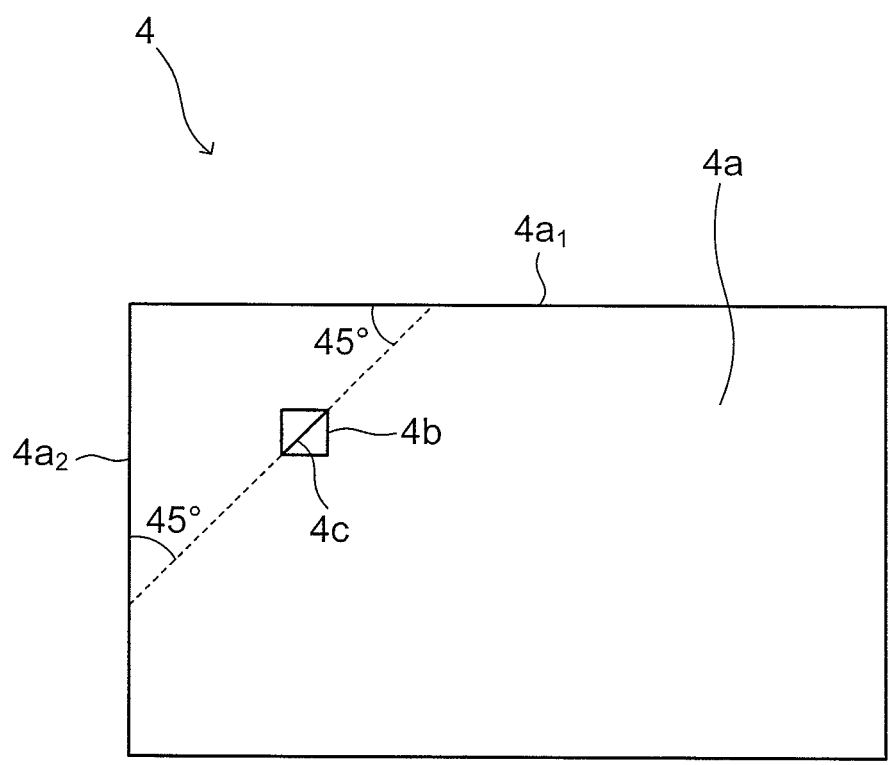
FIG. 4 A plan view of a DMD incorporated in the image projection device.

The DMD 4, which is a digital micromirror device (product by Texas Instruments Inc. in USA) having a plurality of micromirrors which correspond to pixels and are arranged in a matrix, serves as a display element which modulates incident light and displays an image thereon. Here, FIG. 4 is a plan view of the DMD 4. The DMD 4 has a rectangular image display region 4a, and a rotation axis 4c of each of the mirrors 4b functioning as pixels is disposed at an angle of 45° with respect to a long side $4a_1$ and a short side $4a_2$ of the image display region 4a.

Each of the mirrors 4b of the DMD 4 reflects the illumination light in a state in which it is tilted by 12° toward an optical axis of the illumination light, to thereby direct ON light as the projection light in a direction perpendicular to the image display region 4a of the DMD 4. On the other hand, each of the mirrors 4b of the DMD 4 reflects the illumination light in a state in which it is tilted by 12° toward an opposite direction, to thereby direct OFF light outward at an exit angle of 48°. The ON light is directed to the screen via the TIR prism 3 and the projection optical system 5 in this order, but the OFF light, which leaves the mirrors 4b at a large exit angle, does not enter the projection optical system 5, and thus does not reach the screen. By controlling the inclination of the mirrors 4b in a binary ON/OFF manner in this way, it is possible to display an image on the DMD 4 and project the image onto the screen.

Also, in the DMD 4, each of the mirrors 4b rotates about the rotation axis 4c by ±12° to thereby express ON/OFF, and thus the TIR prism 3 and the DMD 4 are disposed such that the incidence plane of the critical surface 31b and those of the mirrors of the DMD 4 are parallel to each other. Thanks to this positional relationship, it is possible to efficiently separate the projection light and the illumination light from each other at the TIR prism 3 such that only ON light included in the light reflected from the mirrors 4b of the DMD 4 is directed through the critical surface 31b to the screen.

(1-6. Details of Polarization Conversion Optical System)

Figure 5A:
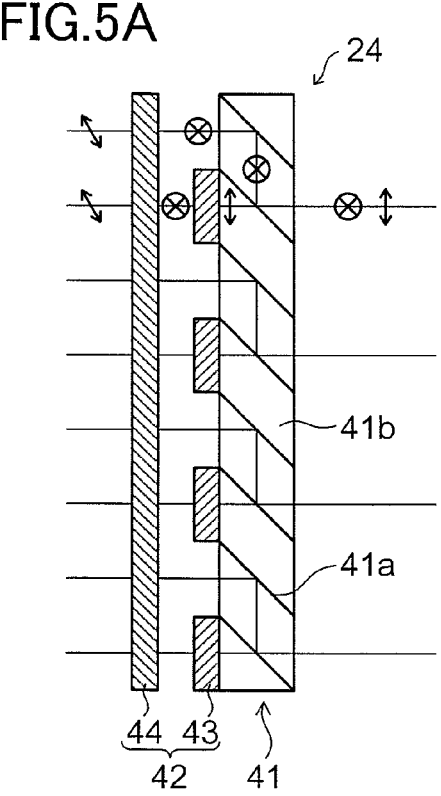
FIG. 5 Diagrams where (a) is a cross-sectional view showing an example of a configuration of a polarization conversion optical system incorporated in the image projection device, (b) is a cross-sectional view showing another example of the configuration of the polarization conversion optical system, and (c) is a cross-sectional view showing still another example of the configuration of the polarization conversion optical system.

Next, a description will be given of details of the above-described the polarization conversion optical system 24. FIG. 5(a) is a cross-sectional view showing an example of the configuration of the polarization conversion optical system 24. The polarization conversion optical system 24 comprises the PBS prism array 41 and polarization control means 42.

The PBS prism array 41 is a polarization separation element which separates the light from the light source 1 into two linearly polarized lights (P-polarized light and S-polarized light) having different polarization directions, and the PBS prism array 41 is formed by bonding a plurality of PBS films 41a and a plurality of prisms 41b to each other in an alternate manner. Each of the PBS films 41a is a strip-shaped optical thin film that transmits P-polarized light but reflects S-polarized light included in incident light, and the PBS films 41a are disposed at 45° with respect to an optical axis of the illumination relay system 23 (see FIG. 1), in parallel with each other and at equal intervals. Each of the prisms 41b is made of glass, for example, such that a cross-sectional shape of a prism 41b sandwiched between two PBS films 41a is parallelogramic.

A direction in which the PBS films 41a are aligned, that is, a polarization separation direction at the PBS prism array 41, corresponds to a long side of the image display region 4a of the DMD 4. Also, as mentioned above, the cross-sectional shape of the rod integrator 22 is substantially similar to the shape of the rectangular image display region of the DMD 4. Thus, the polarization separation direction at the PBS prism array 41, the long-side direction of the image display region 4a of the DMD 4, and the long-side direction of the rectangular cross-section of the rod integrator 22 optically correspond to each other.

The polarization control means 42 aligns the polarization directions of the two linearly polarized lights resulting from the polarization separation by the PBS prism array 41 with one same direction that is parallel to the incidence plane of the critical surface 31b of the TIR prism 3, and outputs resulting linearly polarized lights. The polarization control means 42 comprises, for example, phase plates which are disposed at least one at an optical path of each of the above-mentioned two linearly polarized lights. In FIG. 5(a), the phase plates are first phase plates 43 and a second phase plate 44.

The first phase plates 43 are phase plates which are each disposed at an optical path of one linearly polarized light of the two linearly polarized lights resulting from the polarization separation by the PBS prism array 41. The first phase plates 43 are formed of, for example, ½ wavelength plates, which are, on the DMD 4 side of the PBS prism array 41, bonded to every other one of the prisms 41b so as to face every other one of the PBS films 41a. The first phase plate 43 converts the one linearly polarized light (for example, P-polarized light) which has passed through the PBS films 41a into a linearly polarized light (for example, S-polarized light) which is polarized in the same direction as the other linearly polarized light of the two linearly polarized lights.

The second phase plate 44 is a phase plate which is disposed at optical paths of both of the two linearly polarized lights resulting from the polarization separation, and is formed of, for example, a ½ wavelength plate; the second phase plate 44 is disposed on the DMD 4 side of the PBS prism array 41 and the first phase plates 43. The second phase plate 44 rotates one linearly polarized light (for example, S-polarized light) which is incident thereon from the PBS prism array 41 via the first phase plate 43 and the other linearly polarized light (for example, S-polarized light) which is incident thereon directly from the PBS prism array 41 both in a same direction (for example, by 45°) such that the polarization directions of both of the linearly polarized lights are parallel to the incidence plane of the critical surface 31b.

With this configuration of the polarization conversion optical system 24, light that has passed through an entrance-side lens of the illumination relay system 23 forms an image on the PBS prism array 41, and is also separated into a P-polarized light and a first S-polarized light by the PBS films 41a. The P-polarized light passes through the PBS films 41a to be incident on the first phase plates 43, and is converted into a second S-polarized light by passing through the first phase plates 43. The second S-polarized light is incident on the second phase plate 44.

On the other hand, the PBS films 41a each reflect the first S-polarized light toward an adjacent one of the PBS films 41a, where the first S-polarized light is reflected again; the first S-polarized light then passes between adjacent first phase plates 43 and 43 to be incident on the second phase plate 44 as S-polarized light.

The above-described linearly polarized light (S-polarized light based on the PBS films 41a) incident on the second phase plate 44 has a polarization direction thereof tilted by 45° there, enters the critical surface 31b of the TIR prism 3 as P-polarization light, and is totally reflected there to be directed to the DMD 4. At this time, as described above, since the incidence plane of the critical surface 31b and those of the mirrors 4b are parallel to each other, light is incident on the mirrors 4b of the DMD 4 as P-polarized state. Also, the image light from the mirrors 4b of the DMD 4 is incident on the critical surface 31b as P-polarized light, and is directed to the screen.

With the configuration where, as in this embodiment, (1) the display element is formed of the DMD 4 in which the rotation axis 4c (see FIG. 4) of each of the mirrors 4b is disposed to form angles of 45° with the long side $4a_1$ and the short side $4a_2$ of the image display region 4a, (2) the critical surface 31b as a reflection surface and one of the mirrors 4b that is located in a center of the image display region 4a are in a positional relationship such that their incidence planes are, for example, parallel to each other, and (3) the PBS prism array 41 separates the light from the light source 1 into two linearly polarized lights having different polarization directions in a direction corresponding to the long-side direction of the image display region 4a of the DMD 4, the polarization directions of the two linearly polarized lights soon after separation from each other are not either parallel or perpendicular to the incidence plane of the critical surface 31b, but the polarization directions, for example, form angles of ±45° with respect to the incidence plane.

However, the two linearly polarized lights which are separated from each other by the PBS prism array 41 emanate from the polarization control means 42 in a state where the polarization directions thereof are aligned with one same direction that is parallel to the incidence plane of the critical surface 31b, and thus, a polarization state of the linearly polarized light is not disturbed when reflected by the critical surface 31b. And, with the configuration described in (2) above, the one of the mirrors 4b located in the center of the image display region 4a can be illuminated with light with a single linear polarization (P-polarized light) that is parallel to the incidence plane. If the mirror 4b located in the center of the image display region 4a can be illuminated in this way, it can be said that the other mirrors 4b can also be illuminated with light with a single linear polarization whose polarization state is not virtually disturbed. This makes it possible to project an image onto the screen without degrading the efficiency of using light reflected from the mirrors 4b. That is, light amount of the projection image can be prevented from reducing in projecting an image by making use of polarized light.

Further, the polarization control means 42 is composed of the phase plates (the first phase plates 43 and the second phase plate 44) which are disposed at least one at an optical path of each of the two linearly polarized lights separated from each other by the PBS prism array 41, and thus, by appropriately setting optical axis of these, it is possible to direct a linearly polarized light that is parallel to the incidence plane of the critical surface 31b from the polarization conversion optical system 24 to be incident on the critical surface 31b. Thus, the polarization control means 42 of the polarization conversion optical system 24 can be achieved with a simple configuration of using the above-described phase plates.

Further, since the above-described phase plates are the first phase plates 43 and the second phase plate 44 as described above, by converting, by using the first phase plate 43, one linearly polarized light of the two linearly polarized lights resulting from the polarization separation into a linearly polarized light having a same polarization direction as the other linearly polarized light, and by rotating both of the linearly polarized lights in the same direction by using the second phase plate 44, it is possible to arrange such that the linearly polarized lights which are parallel to the incidence plane of the critical surface 31b are incident on the critical surface 31b. Thus, the polarization control means 42 can be securely achieved with a simple configuration of using the first phase plates 43 and the second phase plate 44.

Further, according to this embodiment, the rod integrator 22 forms an illumination light beam having a shape that is substantially similar to the shape of the image display region 4a of the DMD 4, the polarization separation direction at the PBS prism array 41 also corresponds to the long-side direction of the cross-section (having a rectangular shape) of the illumination light beam. This helps achieve efficient polarization conversion at the polarization control means 42.

That is, the secondary light source images formed by the rod integrator 22 appear on the pupil plane of the illumination relay system 23 according to the number of times of the reflection occurring in the rod integrator 22, and the secondary light source images are distributed at a wider pitch in the long-side direction of the cross-section of the rod integrator 22. The long-side direction corresponds to the long-side direction of the image display region 4a of the DMD 4. Thus, by generating light source images by polarization separation between light source images formed by the rod integrator 22 by using the polarization conversion optical system 24, that is, by performing polarization separation in the wider-pitch distribution direction to achieve the polarization conversion, it is possible to efficiently align the polarization state.

(1-7. Another Configuration of Polarization Conversion Optical System)

Figure 5B:
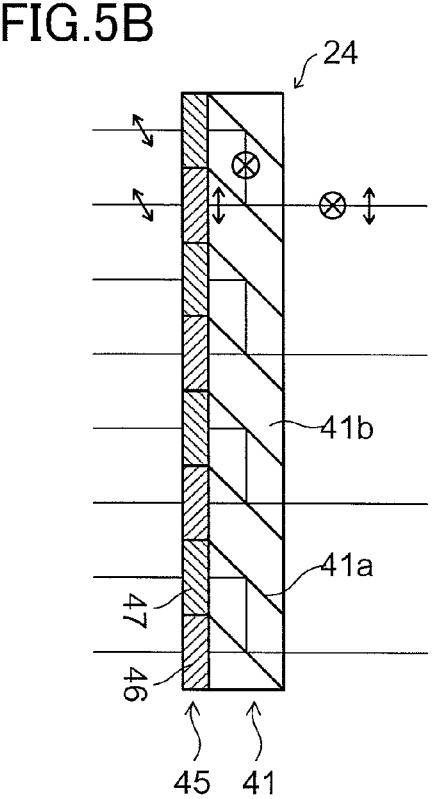

FIG. 5(b) is a cross-sectional view showing another example of the configuration of the polarization conversion optical system 24. As shown in FIG. 5(b), the polarization conversion optical system 24 may comprise the PBS prism array 41 and polarization control means 45. The polarization control means 45 aligns the polarization directions of the two linearly polarized lights resulting from the polarization separation by the PBS prism array 41 with one same direction that is parallel to the incidence plane of the critical surface 31b of the TIR prism 3, and outputs resulting linearly polarized lights. The polarization control means 45 is composed of, for example, phase plates which are disposed at least one at an optical path of each of the above-mentioned two linearly polarized lights. The phase plates of the polarization control means 45 are third phase plates 46 and fourth phase plates 47.

The third phase plates 46 are phase plates which are each disposed at an optical path of one linearly polarized light (for example, P-polarized light) of the two linearly polarized lights resulting from the polarization separation by the PBS prism array 41. The third phase plates 46 are formed of, for example, ½ wavelength plates, and on the DMD 4 side of the PBS prism array 41, bonded to every other one of the prisms 41b so as to face every other one of the PBS films 41a. The third phase plates 46 rotate the one linearly polarized light into a linearly polarized light that is polarized in a direction that is parallel to the incidence plane of the critical surface 31b.

The fourth phase plates 47 are phase plates which are each disposed at an optical path of the other linearly polarized light (for example, S-polarized light) of the two linearly polarized lights resulting from the polarization separation. The fourth phase plates 47 are formed of, for example, ½ wavelength plates, and disposed on the DMD 4 side of the PBS prism array 41 such that the third phase plates 46 and the fourth phase plates 47 are alternately located in the polarization separation direction of the PBS prism array 41. That is, like the third phase plates 46, the fourth phase plates 47 are also bonded to every other one of the prisms 41b so as to face every other one of the PBS films 41a. The fourth phase plates 47 rotate the other linearly polarized light into a linearly polarized light that is polarized in the same direction as the linearly polarized light obtained by the third phase plates 46 rotating the one linearly polarized light. That is, the third phase plates 46 and the fourth phases plate 47 each convert the polarization direction of the corresponding one of the linearly polarized lights into a direction tilted by ±45° from the respective original polarization directions, to thereby direct the linearly polarized lights whose polarization directions are parallel to the incidence plane of the critical surface 31b to be incident on the critical surface 31b.

With this configuration, in which the third phase plates 46 rotate the one linearly polarized light (for example, P-polarized light) of the two linearly polarized lights resulting from the polarization separation at the PBS prism array 41, and in which the fourth phase plates 47 rotate the other linearly polarized light (for example S-polarized light) of the two linearly polarized lights, it is possible to direct the linearly polarized lights whose polarization directions are parallel to the incidence plane of the critical surface 31b to be incident on the critical surface 31b. Thus, the polarization control means 45 can be securely achieved with a simple configuration of using the third phase plates 46 and the fourth phase plates 47. Further, the number of phase plates disposed at the optical paths of the two linearly polarized lights is set such that the optical paths of the two linearly polarized lights each have one third phase plate 46 or one fourth phase plate 47 disposed therein, and thus a minimum number of phase plates are disposed at the optical paths; this makes it possible to minimize the number of interfaces between phase plates and air in the optical path, which helps minimize occurrence of light amount reduction due to surface reflection at such interfaces.

(1-8. Still Another Configuration of Polarization Conversion Optical System)

Figure 5C:
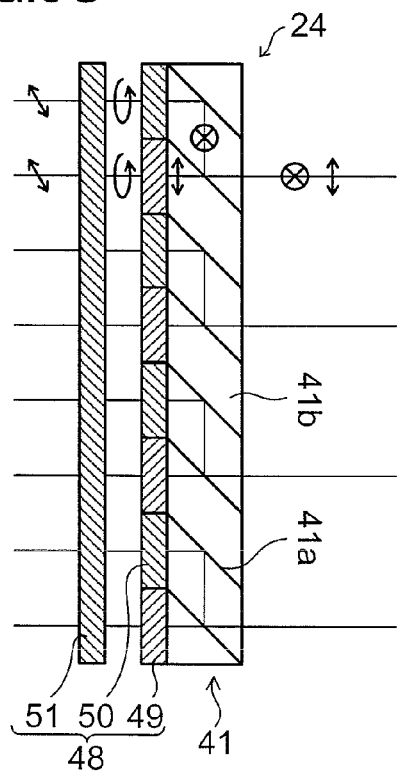

FIG. 5(c) is a cross-sectional view showing still another example of the configuration of the polarization conversion optical system 24. As shown in FIG. 5(c), the polarization conversion optical system 24 may comprise the PBS prism array 41 and polarization control means 48. The polarization control means 48 aligns the polarization directions of the two linearly polarized lights resulting from the polarization separation by the PBS prism array 41 in one polarization direction that is parallel to the incidence plane of the critical surface 31b of the TIR prism 3, and outputs resulting linearly polarized lights. The polarization control means 48 is composed of, for example, phase plates which are disposed at least one at an optical path of each of the above-mentioned two linearly polarized lights. The phase plates of the polarization control means 48 are fifth phase plates 49, sixth phase plates 50, and a seventh phase plate 51.

The fifth phase plates 49 are phase plates which are each disposed at an optical path of one linearly polarized light (for example, P-polarized light) of the two linearly polarized lights resulting from the polarization separation by the PBS prism array 41. The fifth phase plates 49 are formed of, for example, ¼ wavelength plates, and on the DMD 4 side of the PBS prism array 41, bonded to every other one of the prisms 41b so as to face every other one of the PBS films 41a. The fifth phase plates 49 convert the one linearly polarized light into a circularly polarized light.

The sixth phase plates 50 are phase plates which are each disposed at an optical path of the other linearly polarized light (for example, S-polarized light) of the two linearly polarized lights resulting from the polarization separation. The sixth phase plates 50 are formed of, for example, ¼ wavelength plates, and disposed on the DMD 4 side of the PBS prism array 41 such that the fifth phase plates 49 and the sixth phase plates 50 are alternately located in the polarization separation direction of the PBS prism array 41. That is, like the fifth phase plates 49, the sixth phase plates 50 are also bonded to every other one of the prisms 41b so as to face every other one of the PBS films 41a. The sixth phase plates 50 convert the other linearly polarized light into a circularly polarized light having a same rotation direction as the circularly polarized light resulting from the conversion by the fifth phase plates 49.

The seventh phase plate 51 is a phase plate which is disposed at optical paths of both of the two linearly polarized lights resulting from the polarization separation, and is formed of, for example, a ¼ wavelength plate; the seventh phase plate 51 is disposed on the DMD 4 side of the fifth phase plates 49 and the sixth phase plates 50. The seventh phase plate 51 converts the circularly polarized lights resulting from the conversion by the fifth phase plates 49 and the conversion by the sixth phase plates 50 into linearly polarized lights having a same polarization direction that is parallel to the incidence plane of the critical surface 31b.

With this configuration, in which the one linearly polarized light (for example, P-polarized light) of the two linearly polarized lights resulting from the polarization separation is converted into a circularly polarized light by the fifth phase plates 49, in which the other linearly polarized light (for example, S-polarized light) of the two linearly polarized lights is converted by the sixth phase plates 50 into a circularly polarized light having the same rotation direction as the above-mentioned circularly polarized light, and in which both of these circularly polarized lights are converted by the seventh phase plate 51 into linearly polarized lights polarized in a same direction, it is possible to direct the linearly polarized lights whose polarization directions are parallel to the incidence plane of the critical surface 31b to be incident on the critical surface 31b. Thus, the polarization control means 48 can be securely achieved with a simple configuration of using the fifth phase plates 49, the sixth phase plates 50, and the seventh phase plate 51. Also, by forming all the phase plates of the polarization control means 48 of ¼ wavelength plates as described above, the phase plates, which make use of structural birefringence, may have shallow depressions, and this facilitates manufacturing of the phase plates by molding even with glass with which material highly reliable phase plates can be manufactured in contrast to conventionally-used organic material.

Incidentally, the above-described polarization control means 42, 45, and 48 may align the polarization directions of the two linearly polarized lights resulting from the polarization separation by the PBS prism array 41 with one same direction that is perpendicular to the incidence plane of the critical surface 31b, and output the resulting linearly polarized light. This case, however, in which illumination light is incident on the critical surface 31b of the TIR prism 3 as S-polarized light, and thus image light from the DMD 4 is incident on the critical surface 31b as S-polarized light, may suffer loss of light amount due to surface reflection at the critical surface 31b; but nonetheless, it is possible to prevent the polarization state of light resulting from the illumination light being reflected by the critical surface 31b from being disturbed and to illuminate the mirrors 4b of the DMD 4 with light with a single linear polarization. It should be noted that the loss of light amount mentioned above can be sufficiently alleviated by, for example, improving characteristics of a single-layer protection coat of the critical surface 31b.

Incidentally, as a reflection surface which reflects light from the polarization conversion optical system 24 to direct the light to the DMD 4, a reflection mirror may be provided at the optical path, or, as in a later-discussed Embodiment 2, a dichroic surface of a color prism may be provided in addition to the critical surface 31b. Two or more reflection surfaces described above may be provided as long as the reflection surfaces are arranged such that their incidence planes are parallel or perpendicular to each other, and as long as the polarization conversion optical system 24 aligns the polarization directions of the two linearly polarized lights resulting from the polarization separation such that they are parallel or perpendicular to the incidence planes of the reflection surfaces and outputs resulting linearly polarized lights.

Embodiment 2

Hereinafter, another embodiment of the present invention will be described with reference to the relevant drawings. For the sake of convenience of description, such parts as find their counterparts in Embodiment 1 are identified by common reference numerals, and overlapping description thereof will be omitted.

Figure 6:
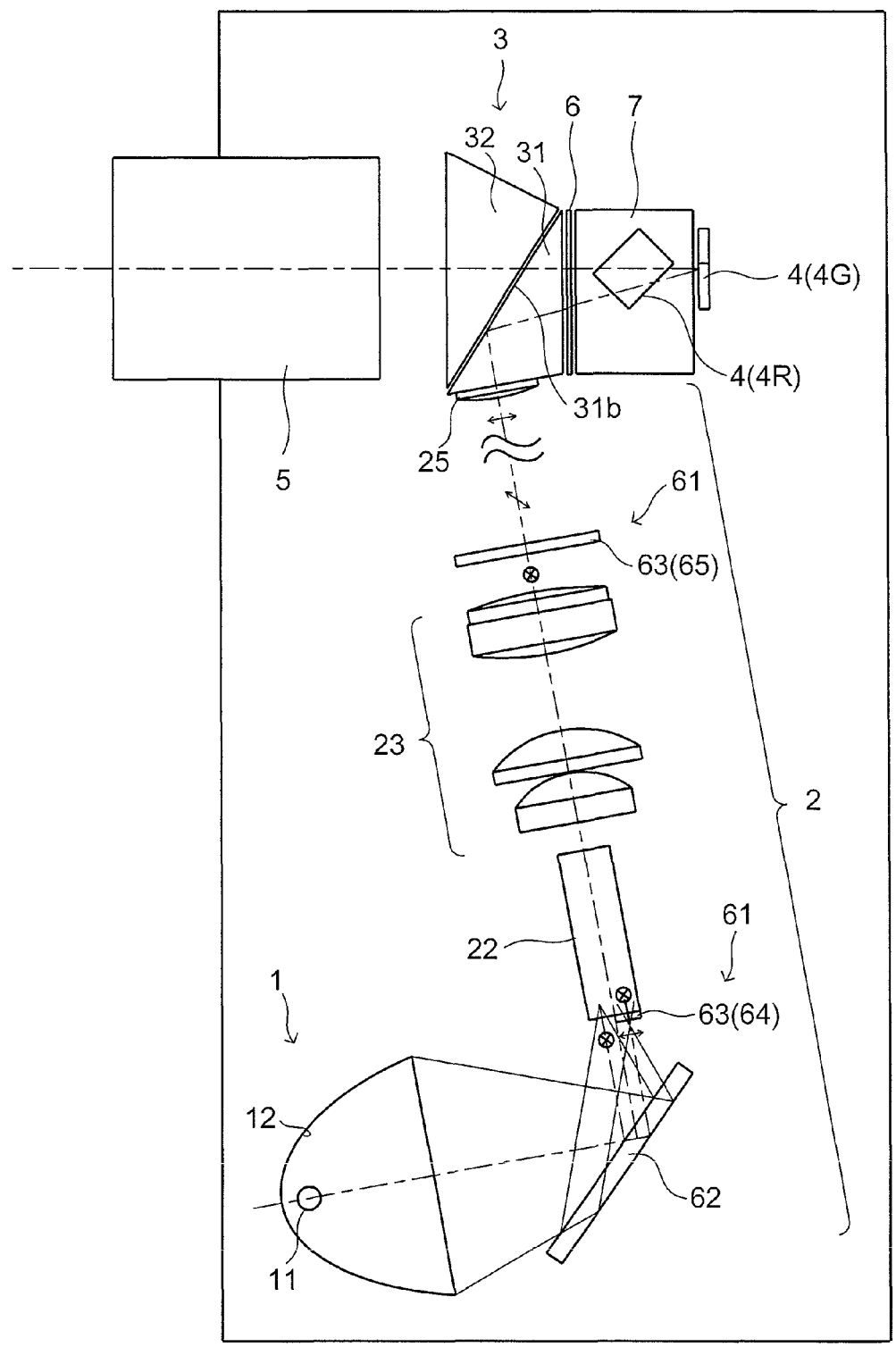
FIG. 6 A cross-sectional view schematically showing a configuration of an image projection device according to another embodiment of the present invention.

FIG. 6 is a cross-sectional view schematically showing a configuration of an image projection device according to this embodiment. The image projection device of this embodiment is similar in configuration to the image projection device of Embodiment 1 except that a polarization conversion optical system 61 is used instead of the polarization conversion optical system 24 of the illumination optical system 2, that a color selective polarization plate 6 and a color prism 7 are disposed at an optical path between a TIR prism 3 and a DMD 4, and that the DMD 4 comprises a plurality of DMDs corresponding to colors of red, green, and blue.

Here, a polarization separation direction at an illumination optical system 2 (the polarization conversion optical system 61) is actually tilted by 45°, and is thus skew, with respect to an incidence plane of a critical surface 31b of the TIR prism 3, but in FIG. 6, in order to make the description easier to understand, the incidence plane and the polarization separation direction are indicated in a same plane.

In this configuration, light (for example, white light from a xenon lamp) emitted by a light source 1 enters the TIR prism 3 via the illumination optical system 2; the light is totally reflected at the TIR prism 3, and is then incident on the DMD 4 via the color selective polarization plate 6 and the color prism 7. The light incident on the DMD 4 is modulated there to then emanate therefrom as image light, which passes through the color selective polarization plate 6 and the TIR prism 3 in this order via the color prism 7 to be then directed via a projection optical system 5 to a screen.

Here, when right-eye images and left-eye images are alternately displayed on the DMD 4 in a time-division manner and a viewer wears a pair of shutter glasses which alternately transmit the linearly polarized light of the right-eye images and the linearly polarized light of the left-eye images in synchronization with the time-division display, the viewer can enjoy projection images as 3D images by viewing the right-eye images with the right eye and the left-eye images with the left eye. Hereinafter, detailed descriptions will be given of features that distinguish Embodiment 2 from Embodiment 1.

(2-1. Polarization Conversion Optical System)

The polarization conversion optical system 61 is an optical system that converts the light from the light source 1 into a linearly polarized light having an aligned polarization direction, and comprises a plate 62 and polarization control means 63.

Figure 7:
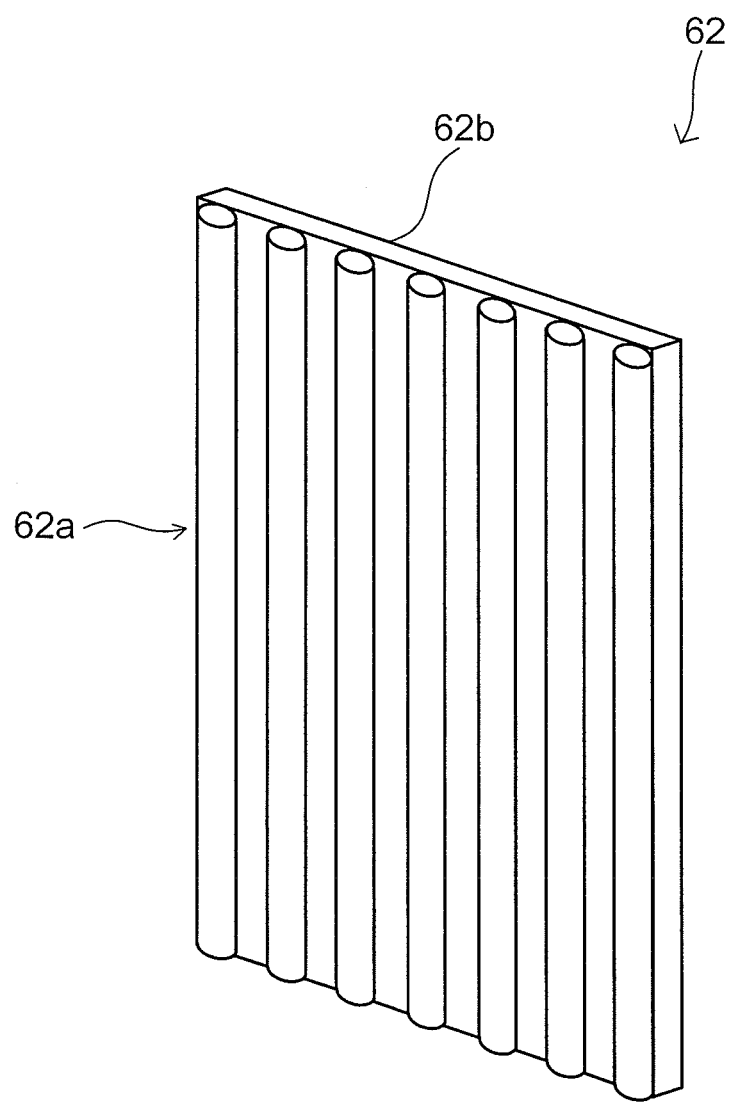
FIG. 7 A perspective view schematically showing a configuration of a plate of a polarization conversion optical system incorporated in the image projection device.

Here, FIG. 7 is a perspective view schematically showing a configuration of the plate 62. The plate 62 is a polarization separation element which separates the light from the light source 1 into two linearly polarized lights having different polarization directions. On a front side of the plate 62, a wire grid 62a is formed with metal wires which are arranged to be equally spaced from each other, and on a back side of the plate 62, a reflection surface 62b is formed. Specifically, the plate 62 reflects a linearly polarized light whose polarization direction is parallel to the wires which is included in light incident on the wire grid 62a to direct the linearly polarized light to the polarization control means 63, while the plate 62 transmits a linearly polarized light whose polarization direction is perpendicular to the wires which is included in the light incident on the wire grid 62a; the transmitted light is then reflected by the reflection surface 62b to be directed to the polarization control means 63. The plate 62 is disposed at an optical path between the light source 1 and a rod integrator 22 such that a polarization separation direction is a direction corresponding to a long-side direction of an image display region 4a of the DMD 4.

The polarization control means 63 aligns the polarization directions of the two linearly polarized lights resulting from the polarization separation by the plate 62 with one same direction that is parallel to the incidence plane of the critical surface 31b of the TIR prism 3, and outputs resulting linearly polarized lights. The polarization control means 63 is composed of, for example, phase plates which are disposed at least one at an optical path of each of the above-mentioned two linearly polarized lights. In FIG. 6, the phase plates are two phase plates 64 and 65.

The phase plate 64 is a phase plate (first phase plate) that is disposed at an optical path of one linearly polarized light of the two linearly polarized lights resulting from the polarization separation by the plate 62, and the phase plate 64 is formed of, for example, a ½ wavelength plate, and disposed on a light entrance side of the rod integrator 22. The phase plate 64 converts the one linearly polarized light (for example, P-polarized light) which is incident thereon via the plate 62 into a linearly polarized light (for example, S-polarized light) having a same polarization direction as the other linearly polarized light of the two linearly polarized lights.

The phase plate 65 is a phase plate (second phase plate) that is disposed at optical paths of both of the two linearly polarized lights resulting from the polarization separation by the plate 62, and the phase plate 65 is formed of, for example, a ½ wavelength plate, and disposed at an optical path between an illumination relay system 23 and an entrance lens 25. The phase plate 65 rotates the one linearly polarized light (for example, S-polarized light) which is incident thereon from the plate 62 via the phase plate 64, the rod integrator 22, and the illumination relay system 23 in this order and the other linearly polarized light (for example, S-polarized light) which is incident thereon from the plate 62 via the rod integrator 22 and the illumination relay system 23 in this order both in a same direction (for example, by 45°) such that the polarization directions of the two linearly polarized lights are parallel to the incidence plane of the critical surface 31b.

In this configuration, a light beam from a reflector 12 of the light source 1 is incident on the plate 62 of the polarization conversion optical system 61 from the wire grid 62a side. At this time, a light beam that is S-polarized with respect to the plate 62 is reflected by the wire grid 62a, while a light beam that is P-polarized with respect to the plate 62 passes through the wire grid 62a, and is then reflected by the reflection surface 62b, to pass through the wire grid 62a again. At this time, an optical axis of the light beam of the P-polarized component is displaced with respect an optical axis of the light beam of the S-polarized component by an amount corresponding to a thickness of the plate 62, the light beams have different collection positions. Thus, the phase plate 64 is disposed at a collection position of the light beam of the P-polarized component, and there, the light beam is converted into S-polarized light, and directed into the rod integrator 22 in a state of aligned polarization.

Here, a cross-sectional shape of the rod integrator 22 is substantially similar to a shape of a rectangular image display region of the DMD 4, and a long-side direction in the (rectangular) cross-section of the rod integrator 22 coincides with a direction in which two light source images of S-polarized light and P-polarized light are aligned. This makes it possible to efficiently direct light beams into the rod integrator 22 even if a light-beam width is increased by an amount corresponding to the displacement between the optical axes of the S-polarized light and the P-polarized light.

Also, each side of the cross-section of the rod integrator 22 is either perpendicular or parallel to the aligned polarization direction of the linearly polarized light, and thus the linearly polarized light is propagated without having its polarization state disturbed by being repeatedly reflected in the rod integrator 22, and emanates from a light exit surface of the rod integrator 22 in an aligned polarization state and having a uniform light amount distribution. The light emanating from the light exit surface of the rod integrator 22 is directed to the DMD 4 by the illumination relay system 23, and thereby, the DMD 4 is uniformly illuminated.

At this time, with the phase plate 65 disposed at the optical path between the illumination relay system 23 and the TIR prism 3, the light from the illumination relay system 23 is converted by the phase plate 65 into a linearly polarized light whose polarization direction is tilted by 45°, and is incident on the critical surface 31b as P-polarized light. The illumination light which is totally reflected by the critical surface 31b enters the color prism 7 via the color selective polarization plate 6, which will be described later, to be split into red light, green light, and blue light, which illuminate corresponding DMDs of the DMD 4.

As described above, since the polarization separation element of the polarization conversion optical system 61 is formed as the plate 62 having the metal wire grid 62a, the image projection device of this embodiment is highly preferable for usage that requires improved durability and heat resistance as in a case where, for example, a bright image is desired to be projected by using a high-power light source 1.

Figure 8:
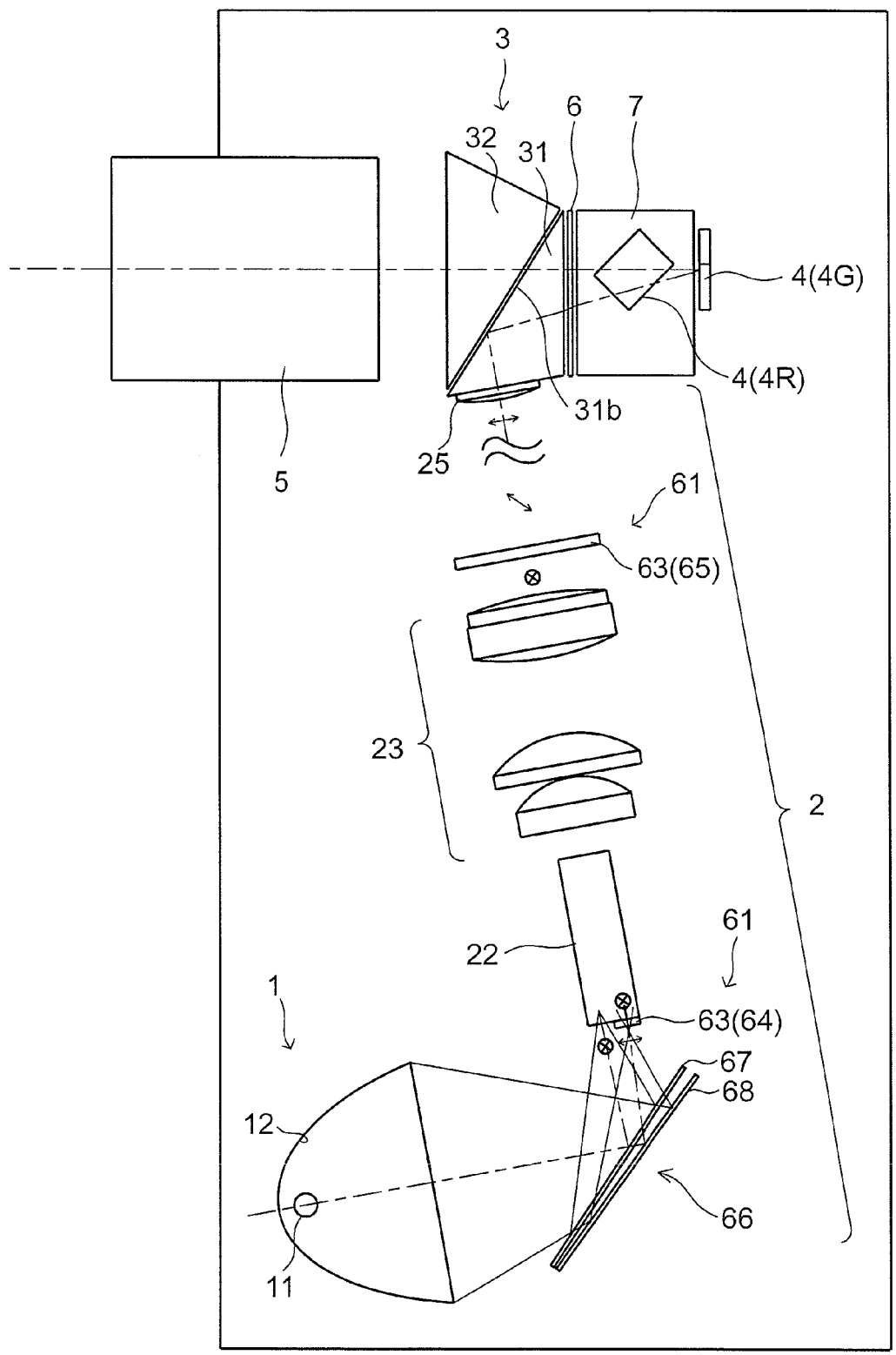
FIG. 8 A cross-sectional view showing another example of the configuration of the polarization conversion optical system.

Now, FIG. 8 is a cross-sectional view showing another example of the configuration of the polarization conversion optical system 61. As shown in the figure, the polarization conversion optical system 61 may comprise a polarization separation element 66 and the above-described polarization control means 63. That is, in the polarization conversion optical system 61 shown in FIG. 8, the polarization separation element 66 is used instead of the plate 62 which is used as a polarization separation element in FIG. 6.

The polarization separation element 66 comprises a wire grid 67 formed with metal wires arranged to be equally spaced from each other, and a reflection mirror 68. The wire grid 67 and the reflection mirror 68 are formed as separate parts, but have the same functions as the wire grid 62a and the reflection surface 62b, respectively, of the above described plate 62. Also, the wire grid 67 and the reflection mirror 68 are disposed at different angles (tilts) with respect to the optical axis, and the wire grid 67 is tilted with respect to the reflection mirror 68.

With this configuration, when light beams from a reflector 12 of the light source 1 are incident on the polarization separation element 66, an S-polarized light beam is reflected by the wire grid 67, while a P-polarized light beam passes through the wire grid 67 to be reflected by the reflection mirror 68, and then passes through the wire grid 67 again. At this time, since the wire grid 67 and the reflection mirror 68 are tilted with respect to the optical axis at different angles from each other, the S-polarized light beam reflected by the wire grid 67 and the P-polarized light beam reflected by the reflection mirror 68 collect at different positions in the rod integrator 22. The phase plate 64 of the polarization control means 63 is disposed at the position where the above-mentioned P-polarized light beam collects, and there, the P-polarized light beam is converted into S-polarized light, and the light beams are directed into the rod integrator 22 as light in an aligned polarization state. Behaviors of the light beams after the rod integrator 22 are the same as in the configuration shown in FIG. 6.

The direction in which polarization separation can be efficiently carried out at the polarization separation element is the long-side direction of the rectangular cross section of the rod integrator, and thus in the configuration shown in FIG. 6, where the wire grid 62a and the reflection surface 62b are parallel to each other, and the displacement between the optical paths of the P-polarized light and the S-polarized light is made used of, positions of the rod integrator 22 and the light source 1 are determined in relation to each other, which reduces flexibility in determining their positions. In contrast, with the configuration as shown in FIG. 8, in which polarization separation is performed by utilizing the relative angular difference between the wire grid 67 and the reflection mirror 68, it is possible to determine the positions of the rod integrator 22 and the light source 1 with much greater flexibility. Specifically, positional relationship between the rod integrator 22 and the light source 1 can be freely set by adjusting relative angles of the wire grid 67 and the reflection mirror 68.

Incidentally, although the polarization separation is carried out within a plane that includes optical axes before and after a light beam from the light source 1 is folded by the polarization separation element 66 in FIG. 8, it is also possible to carry out the polarization separation in a direction perpendicular to the plane including the optical axes before and after the folding (a direction perpendicular to the sheet on which the figure is drawn) by adjusting the angles at which the wire grid 67 and the reflection mirror 68 are disposed.

Instead of forming the wire grid 67 and the reflection mirror 68 as separate members as in FIG. 8, a wire grid may be formed on one side of a wedge shaped plate member and a side opposite from the wire grid may be formed as a reflection surface, for example.

Thus, the following can be said: the polarization separation element 66 of the polarization conversion optical system 61 comprises the reflection mirror 68 and the wire grid 67 which is disposed to be tilted with respect to the reflection mirror 68 and formed by arranging metal wires to be equally spaced from each other; and the polarization separation element 66 reflects a linearly polarized light which is included in incident light and whose polarization direction is parallel to the metal wires, to direct the light to the polarization control means 63, while it transmits a linearly polarized light which is included in the incident light and whose polarization direction is perpendicular to the metal wires such that the light is reflected by the reflection mirror 68 to be directed to the polarization control means 63.

Incidentally, as in Embodiment 1, the polarization control means 63 may align the polarization directions of the two linearly polarized lights resulting from the polarization separation by the plate 62 such that the polarization directions are perpendicular to the incidence plane of the critical surface 31b, and output resulting linearly polarized lights.

Incidentally, it is surely possible to apply the configurations of the polarization control means 45 and 48 (see FIGS. 5(b) and 5(c)) described in Embodiment 1 to the polarization control means 63 of this embodiment.

(2-2. Color Selective Polarization Plate and Color Prism)

Next, descriptions will be given of the color selective polarization plate 6 and the color prism 7. The color selective polarization plate 6 is color selective polarization conversion means which converts a polarization direction of a linearly polarized light that enters the color prism 7 from the TIR prism 3 into a direction that is perpendicular to other polarization directions selectively according to wavelength. More specifically, the color selective polarization plate 6 is formed with a wavelength selective polarization rotator (Symposium of International Display 2001 DIGEST, p. 1084-p. 1087, Color Link Ltd./USA, product name=Color Select) which rotates only a polarization direction of light of green color by 90° with respect to polarization directions of light of colors of red and blue.

Figure 9A:
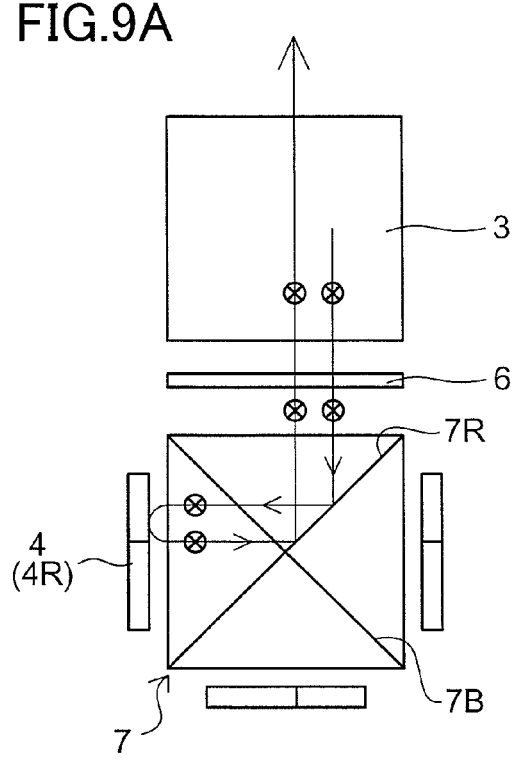
FIG. 9 Diagrams schematically showing a configuration of a color prism incorporated in the image projection device, where (a), (b), and (c) also indicate optical paths and polarization states of red, green, and blue light, respectively.
Figure 9B:
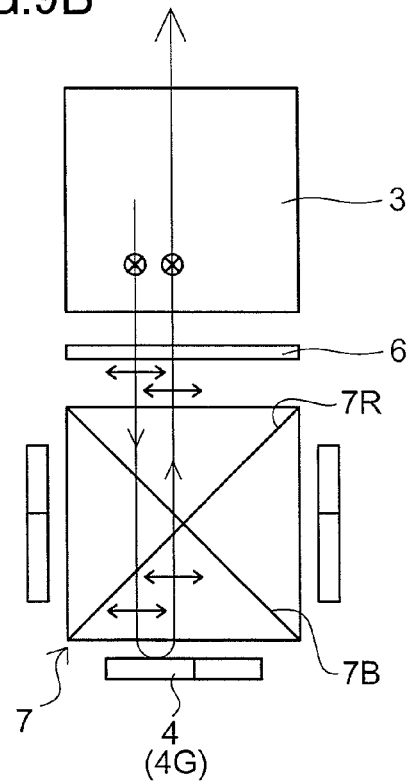
Figure 9C:
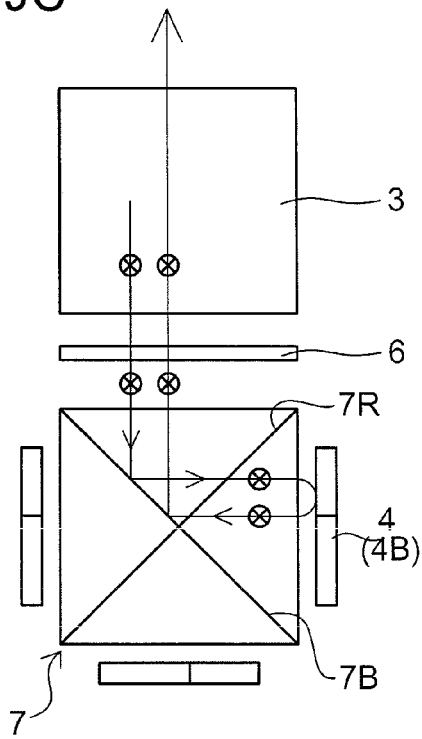

The color prism 7 is color separation/synthesis means which is disposed at an optical path between the color selective polarization plate 6 and the DMD 4. In this embodiment, the DMD 4 comprises DMDs 4R, 4G, and 4B provided corresponding to light of three different colors (red light, green light, and blue light, respectively), and the color prism 7 separates light from the TIR prism 3 into light of the three colors to direct the light to the DMDs 4R, 4G, and 4B according to the colors, and combines light reflected from the DMDs 4R, 4G, and 4B into a same optical path. Here, FIGS. 9(a), 9(b), and 9(c) are diagrams for schematically showing configurations of the color prism 7, and for illustrating optical paths of red light, green light, and blue light, together with respective polarization states. The color prism 7 is formed by bonding four rectangular prisms together; on bonded surfaces, there are formed two dichroic surfaces 7R and 7B (color separation surfaces) which reflect light of colors which are different from each other but transmit light of the other colors such that the dichroic surfaces 7R and 7B perpendicularly cross each other. More specifically, the dichroic surface 7R reflects red incident light while it transmits green incident light and blue incident light. The dichroic surface 7B reflects the blue incident light while it transmits the green incident light and the red incident light.

The color prism 7 is disposed such that a plane that is parallel to normal lines of the dichroic surfaces 7R and 7B (a plane that is parallel to the sheet on which FIG. 9 is drawn) and rotation axes of mirrors of the DMD 4 are parallel to each other. And, an incidence plane of a mirror located at a center of an image display region of each of the DMDs 4R, 4G, and 4B, which correspond to red light, green light, and blue light, respectively is perpendicular to the plane that is parallel to the normal lines of the dichroic surfaces 7R and 7B.

Also, in this embodiment, the incidence plane of the critical surface 31b of the TIR prism 3 is perpendicular to the plane that is parallel to the normal lines of the dichroic surfaces 7R and 7B of the color prism 7, but the incidence plane of the critical surface 31b is optically parallel to the incidence plane of the mirror located at the center of the image display region of the DMD 4G. The TIR prism 3, the color prism 7, and the DMDs 4R, 4G, and 4B are disposed in the positional relationship described above.

In the above configuration, illumination light (P-polarized light) that is totally reflected by the critical surface 31b of the TIR prism 3 is incident on the color selective polarization plate 6, where only green light has its polarization direction rotated by 90°. The incidence planes of the dichroic surfaces 7R and 7B are tilted by approximately 15° with respect to the polarization direction of the green light, but the value is so small that the green light is incident on the dichroic surfaces 7R and 7B as substantially P-polarized light. At the same time, red light and blue light are incident on the dichroic surfaces 7R and 7B as substantially S-polarized light.

Among the light of the three colors, as shown in FIG. 9(a), the red light which is substantially S-polarized with respect to the dichroic surface 7R is reflected by the dichroic surface 7R, and illuminates the DMD 4R for red. Since the rotation axes of the mirrors of the DMD 4R and the incidence plane of the critical surface 31b are optically perpendicular to each other, the illumination light is incident on the mirrors of the DMD 4R as P-polarized light. Here, the term "optically" indicates that geometric arrangement achieved by folding the dichroic surface 7R is not considered.

Also, as shown in FIG. 9(c), the blue light which is substantially S-polarized with respect to the dichroic surface 7B is reflected by the dichroic surface 7B, and illuminates the DMD 4B for blue. Since the rotation axes of the mirrors of the DMD 4R and the incidence plane of the critical surface 31b are optically perpendicular to each other, the illumination light is incident on the mirrors of the DMD 4B as P-polarized light.

In contrast, the green light which is substantially P-polarized with respect to the dichroic surfaces 7R and 7B passes through both of the dichroic surfaces 7R and 7B, and illuminates the DMD 4G for green. Since the rotation axes of the mirrors of the DMD 4R and the incidence plane of the critical surface 31b are optically perpendicular to each other, the illumination light is incident on the mirrors of the DMD 4G as S-polarized light.

The illumination light of each color is incident on a corresponding DMD 4 at an incidence angle of 24°, and each mirror of the DMD 4 reflects the illumination light in a state in which it is tilted by 12° toward an optical axis of the illumination light, to thereby output ON light as projection light in a direction perpendicular to the DMD 4. On the other hand, each mirror of the DMD 4 reflects the illumination light in a state in which it is tilted by 12° toward an opposite direction, to thereby output OFF light at an exit angle of 48°. In each DMD 4, the mirrors each reflect the illumination light without changing the polarization state of the illumination light, and direct the reflected light into the color prism 7 as the projection light.

As shown in FIG. 9(c), blue projection light reflected from the DMD 4B for blue is incident on the dichroic surface 7B as S-polarized light, and is then reflected thereby to be incident on the color selective polarization plate 6. Furthermore, as shown in FIG. 9(b), green projection light reflected from the DMD 4G for green is incident on the dichroic surfaces 7R and 7B as P-polarized light, and is then passes through them to be incident on the color selective polarization plate 6. Moreover, as shown in FIG. 9(a), red projection light reflected from the DMD 4R for red is incident on the dichroic surface 7R as S-polarized light, and is then reflected thereby to be incident on the color selective polarization plate 6. In this way, red, green, and blue light are combined onto a same optical axis, to be incident on the color selective polarization plate 6.

In the projection light resulting from the combining of the colors, only the green light has its polarization direction converted again by 90° at the color selective polarization plate 6. Thus, the red light, the green light, and the blue light are aligned to a same polarization state to leave the color selective polarization plate 6 to be incident on the critical surface 31b of the TIR prism 3 as P-polarized light. The projection light from the DMD 4 does not satisfy a total reflection condition at the critical surface 31b, and thus passes through the critical surface 31b to be directed to a screen via the projection optical system 5. At this time, as in Embodiment 1, the projection light passes through the critical surface 31b as P-polarized light, and this makes it possible to reduce light amount loss due to surface reflection at the critical surface 31b, and thus to make more efficient use of light.

Figure 10:
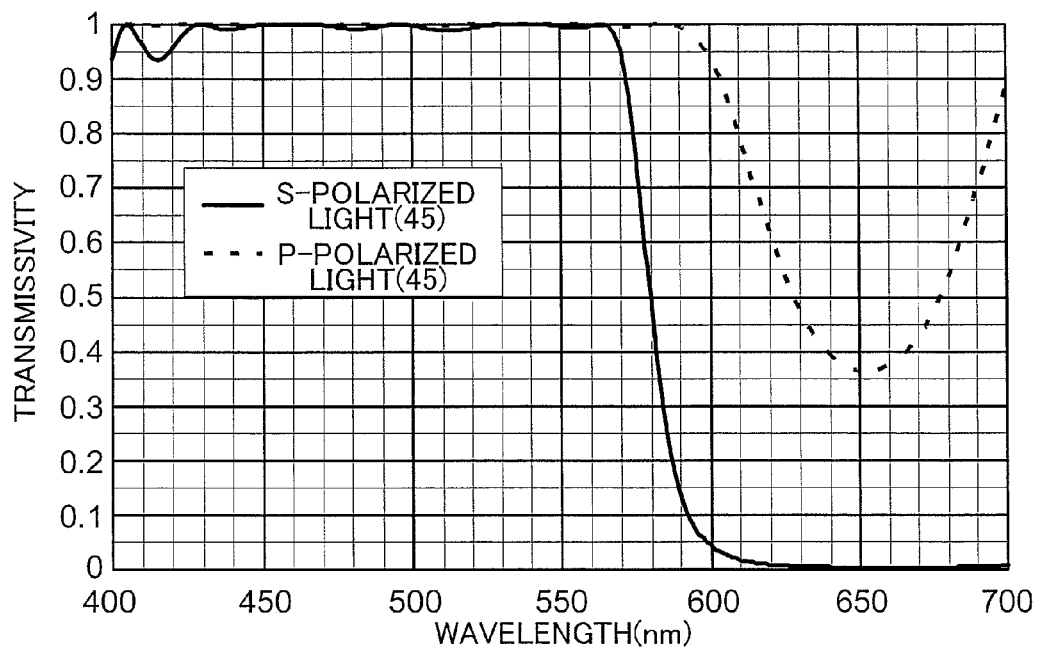
FIG. 10 A diagram for illustrating an optical characteristic of one dichroic surface of the color prism.
Figure 11:
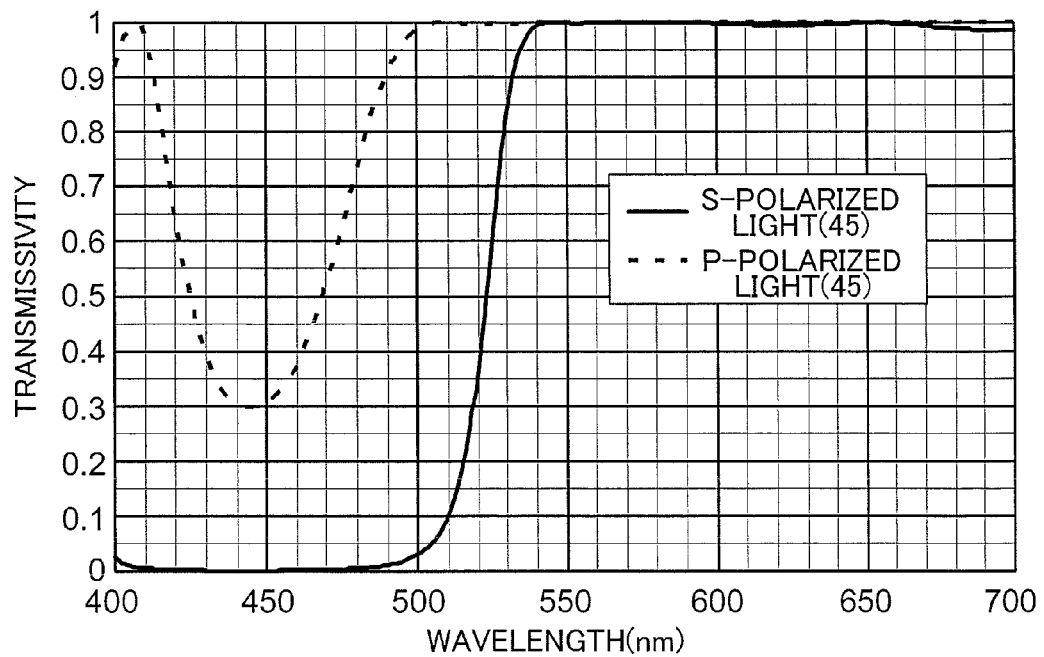
FIG. 11 A diagram for illustrating an optical characteristic of another dichroic surface of the color prism.

Here, FIG. 10 shows an optical characteristic (transmission characteristic) of the dichroic surface 7R, and FIG. 11 shows an optical characteristic (transmission characteristic) of the dichroic surface 7B. In each of the figures, a vertical axis indicates standardized transmissivity.

A wavelength range of red light is approximately 600 to 700 nm, and thus it is clear from the figures that the dichroic surface 7R reflects a sufficiently wide range of S-polarized red light incident thereon and the dichroic surface 7B transmits a sufficiently wide range of S-polarized red light incident thereon.

A wavelength range of blue light is approximately 400 to 500 nm, and thus it is clear from the figures that the dichroic surface 7B reflects a sufficiently wide range of S-polarized blue light incident thereon and the dichroic surface 7R transmits a sufficiently wide range of S-polarized blue light that is incident thereon.

A wavelength range of green light is approximately 500 to 600 nm, and thus it is clear from the figures that the dichroic surfaces 7R and 7B both transmit a sufficiently wide range of P-polarized green light that is incident thereon. It is clear from the figures, to the contrary, that the dichroic surfaces 7R and 7B both transmit only a limited range of S-polarized green light that is incident thereon.

Thus, the dichroic surfaces 7R and 7B of the color prism 7 are characterized such that, with respect to S-polarized light, they easily exhibits satisfactory reflection characteristic in the red and blue wavelength ranges, while, with respect to P-polarized light, they easily exhibits satisfactory transmission characteristic in the green wavelength range. Thus, if the green light is incident on the dichroic surfaces 7R and 7B as P-polarized light, the dichroic surfaces 7R and 7B easily transmit the green light. Also, if the red light is incident on the dichroic surface 7R as S-polarized light, the dichroic surface 7R easily reflects the red light, and if the blue light is incident on the dichroic surface 7B as S-polarized light, the dichroic surface 7B easily reflects the blue right.

Thus, by P-polarizing or S-polarizing light of each color that is to be incident on the dichroic surfaces 7R and 7B, it is possible to achieve highly efficient loss-less color separation and synthesis by using the color prism 7. In particular, in this embodiment, since light passes through the color prism 7 on its way both to and from the DMD 4, by P-polarizing light of a color (green) that merely passes through the dichroic surfaces 7R and 7B, and by S-polarizing light of a color (red or blue) that is reflected by the dichroic surfaces 7R and 7B, it is possible to drastically improve the efficiency of the color separation and synthesis.

As described above, since the rotation axes of the mirrors of the DMDs 4R, 4G, and 4B corresponding to red, green, and blue, respectively, are parallel to the plane that is parallel to the normal lines of the dichroic surfaces 7R and 7B of the color prism 7, when the illumination light (light with a single linear polarization) incident on the critical surface 31b of the TIR prism 3 is totally reflected thereon to be incident on the DMD 4 via the color prism 7, it is possible to prevent the polarization state of the illumination light from being changed (disturbed) when it is reflected or refracted (in particular, when reflected) by each optical surface of the color prism 7, and to prevent the polarization state of the illumination light from being changed (disturbed) when the illumination light is reflected by the mirrors of the DMDs 4R, 4G, and 4B. Thus, it is possible to illuminate the DMDs 4R, 4G, and 4B with light of a single linear polarization and project an image on the screen without degrading the efficiency of using light reflected from the mirrors.

Further, since the color selective polarization plate 6 P-polarizes light (green light) that passes both the dichroic surfaces 7R and 7B of the color prism 7, it is possible to achieve efficient color separation and synthesis at the dichroic surfaces 7R and 7B by making use of the polarization characteristics of the dichroic surfaces 7R and 7B.

Incidentally, although this embodiment employs the color selective polarization plate 6 as the color selective polarization conversion means, a polarization conversion dichroic mirror, for example, may be used instead. The polarization conversion dichroic mirror comprises: a dichroic surface which transmits light of a color (for example green light) in a specific wavelength range and reflects light of a color (for example, red and blue light) in other wavelength ranges; a ¼ wavelength plate corresponding to the wavelength range of the light of the color that passes through the dichroic surface; and a mirror surface that reflects the light of the color that passes through the ¼ wavelength plate, with the dichroic surface, the ¼ wavelength plate and the mirror surface disposed adjacent to each other.

With this configuration, when S-polarized white light is incident on the dichoric surface, red and blue light included in the white light is reflected thereby as S-polarized light, while green light included in the white light passes through the dichroic surface and passes through the ¼ wavelength plate twice, to be converted into, and outputted as, P-polarized light. In this way, by using the polarization conversion dichroic mirror, it is also possible to convert the polarization state only of light of a specific color, and thus, it is possible to use the polarization conversion dichroic mirror as the color selective polarization conversion means of this embodiment.

Furthermore, although this embodiment uses the color prism 7, in which the two dichroic surfaces 7R and 7B are arranged perpendicular to each other, as the color separation/synthesis means, a so-called Philips-type dichroic prism may be used instead. The Philips-type dichroic prism has, for example, three prisms, namely first, second, and third prisms, the first and second prisms being bonded to each other via an air gap layer in between, the second and third prisms being bonded to each other via an air gap layer in between. Here, on a side of the first prism at which the first prism is bonded to the second prism, a dichroic film that reflects blue light is formed, for example. Also, on a side of the second prism at which the second prism is bonded to the third prism, a dichroic film that reflects red light is formed, for example.

With this configuration, when white light enters the first prism, blue light included in the white light is reflected and separated by the dichroic surface of the first prism, red light passes through the first prism to be reflected and separated by the dichroic surface of the second prism, and green light alone passes through both the first and second prisms. Thus, by using such a Philips-type dichroic prism, it is also possible to separate incident light into light of three colors, and further, by directing light of each color into the Philips-type dichroic prism, it is also possible to combine the light of the colors from the display element. Thus, it is possible to use the Philips-type dichroic prism as the color separation/synthesis means of this embodiment.

(2-3. Another Configuration of Image Projection Device)

Figure 12:
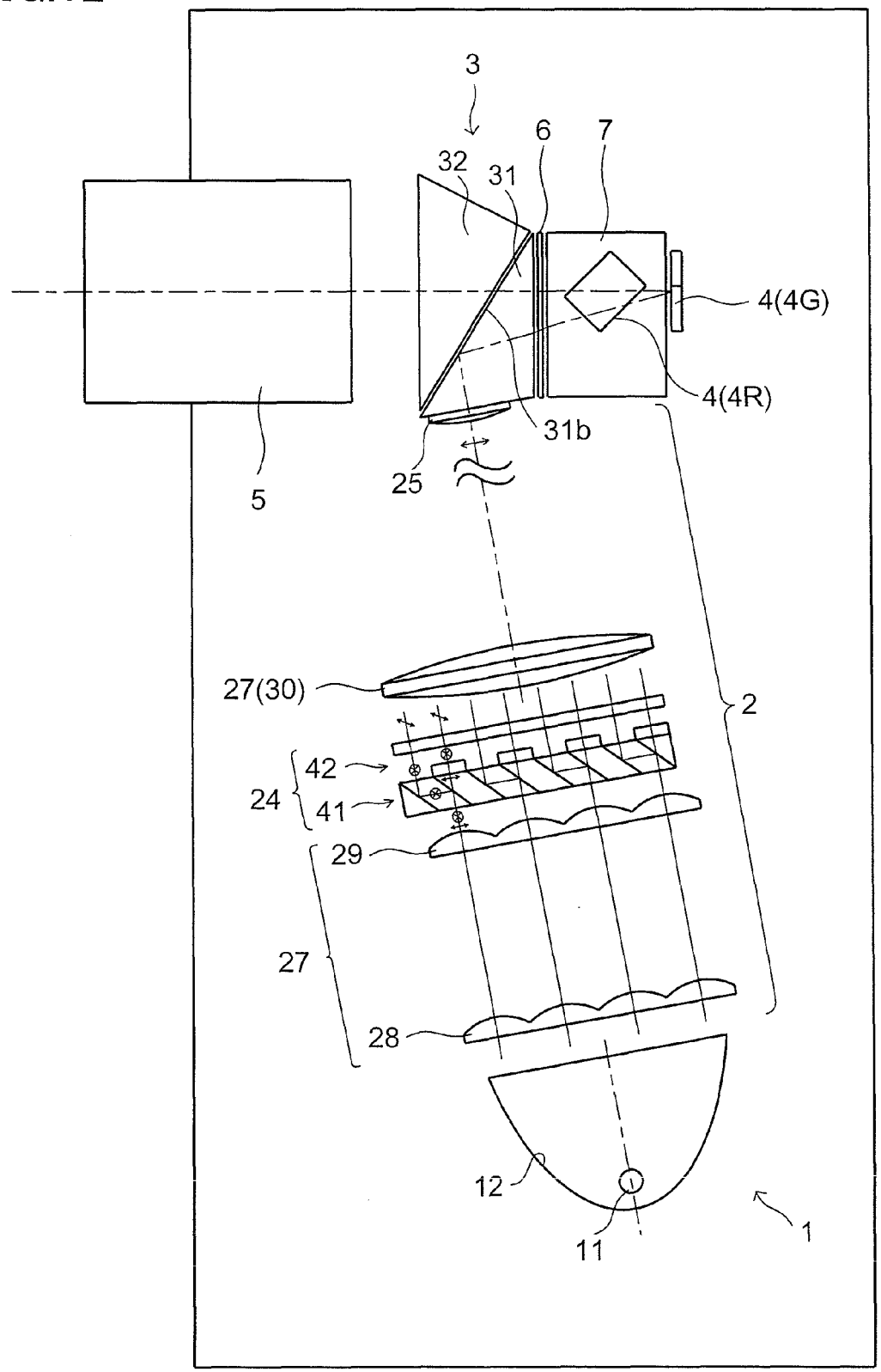
FIG. 12 A cross-sectional view showing another configuration of the image projection device.

FIG. 12 is a cross-sectional view showing another configuration of the image projection device of this embodiment. The configuration of this image projection device is similar to the configuration shown in FIG. 6, except that an illumination optical system 2 comprises an integrator optical system 27 besides the polarization conversion optical system 24 and the entrance lens 25 used in Embodiment 1.

The integrator optical system 27 is an optical system that uniformizes a light amount distribution of the light from the light source 1 and forms an illumination light beam having a uniform light amount distribution and a shape that is similar to the shape of the rectangular image display region of the DMD 4. The integrator optical system 27 comprises a first lens array 28, a second lens array 29, and a superposition lens 30. The polarization conversion optical system 24 is disposed at an optical path between the second lens array 29 and a superposition lens 30.

The first lens array 28 and the second lens array 29 are each formed by arranging a plurality of lens cells each having a shape that is substantially similar to the shape of the image display region of the DMD 4 in a matrix form. The first lens array 28 separates light from the light source 1 into light beams and directs each of the light beams to a corresponding one of the lens cells of the second lens array 29. The second lens array 29 functions such that images of the cells of the first lens array 27 are formed on a display surface (the image display region) of the DMD 4. The superposition lens 30 functions such that the light beams separated by the first lens array 28 are superposed on the display surface of the DMD 4. With this configuration, it is possible to obtain illumination light having a uniform intensity distribution on the display surface of the DMD 4, and thus to uniformly illuminate the DMD 4 to thereby eliminate uneven light amount (uneven brightness) in a projection image.

Furthermore, the PBS prism array 41 of the polarization conversion optical system 24 is disposed near positions at which light is collected by the first lens array 28 (that is, positions of secondary light source images). By the integrator optical system 27 forming an illumination light beam having a shape substantially similar to the shape of the image display region of the DMD 4, a polarization separation direction (a direction corresponding to the long-side direction of the image display region of the DMD 4) at the PBS prism array 41 corresponds to a long-side direction of a cross-section (rectangular) of the illumination light beam as well. This helps achieve efficient polarization separation and polarization conversion at the polarization conversion optical system 24.

Incidentally, Embodiments 1 and 2 have dealt with cases where the TIR prism 3 and the DMD 4 are arranged such that the incidence plane of the critical surface 31*b* of the TIR prism 3 and the incidence plane of the DMD 4 are parallel to each other, but the TIR prism 3 and the DMD 4 may be arranged such that the two incidence planes are perpendicular to each other. In this case as well, it is possible to obtain the same effects that have been described in the descriptions of Embodiments 1 and 2.

It goes without saying that, in addition to the above described configurations, an image projection device may be configured by appropriately combining the configurations of Embodiments 1 and 2. Also, the method for enjoying a projection image as a 3D image is not limited to the above-described methods, but any known method that makes use of polarization may be used.

INDUSTRIAL APPLICABILITY

The present invention is applicable to a configuration where a DMD in which the rotation axis of each mirror forms an angle of 45° with respect to long and short sides of an image display region is used as a display element, the DMD is disposed such that an incidence plane of at least one reflection surface in an optical path of an illumination beam and an incidence plane of a mirror located in a center of the DMD are parallel or perpendicular to each other, and the DMD is illuminated with illumination light resulting from polarization separation in a direction corresponding to a long-side direction of an image display region of the DMD and having an aligned polarization direction.

LIST OF REFERENCE SYMBOLS

1 light source
2 illumination optical system
3 TIR prism (critical angle prism)
4 DMD (display element)
4B DMD (display element)
4G DMD (display element)
4R DMD (display element)
4*a* image display region
4*a*$_1$ long side
4*a*$_2$ short side
4*b* mirror
4*c* rotation axis
5 projection optical system
6 color selective polarization plate (color selective polarization conversion means)
7 color prism
7B dichroic surface
7R dichroic surface
22 rod integrator (integrator optical system)
24 polarization conversion optical system
27 integrator optical system
31*b* critical surface (reflection surface)
41 PBS prism array (polarization separation element)
42 polarization control means
43 first phase plate (polarization control means, phase plate)
44 second phase plate (polarization control means, phase plate)
45 polarization control means
46 third phase plate (polarization control means, phase plate)
47 fourth phase plate (polarization control means, phase plate)
48 polarization control means
49 fifth phase plate (polarization control means, phase plate)
50 sixth phase plate (polarization control means, phase plate)
51 seventh phase plate (polarization control means, phase plate)
61 polarization conversion optical system
62 plate (polarization separation element)
62*a* wire grid
62*b* reflection surface
63 polarization control means
64 phase plate (polarization control means, first phase plate)
65 phase plate (polarization control means, second phase plate)

The invention claimed is:

1. An image projection device, comprising:
a polarization conversion optical system which converts light from a light source into a linearly polarized light having an aligned polarization direction;
a display element which displays an image by modulating incident light;
at least one reflection surface which reflects light from the polarization conversion optical system to direct the light to the display element; and
a projection optical system which projects an image displayed on the display element onto a projection surface,
wherein
the display element comprises a digital micromirror device which has a rectangular image display region in which rotation axes of mirrors functioning as pixels each form an angle of 45° with respect to a long side and with respect to a short side of the image display region;
when a central light ray of a light beam traveling from the light source toward a center of the image display region of the display element is incident on a surface, assuming that a plane including the central light ray incident on the surface and a normal line of the surface at a point where the central light ray is incident thereon is an incidence plane, an incidence plane of the at least one reflection surface and an incidence plane of a mirror at a center of the image display region of the display element are parallel or perpendicular to each other; and
the polarization conversion optical system has:

a polarization separation element which performs polarization separation to separate light from the light source into two linearly polarized lights having different polarization directions, and a direction of the polarization separation is a direction corresponding to a long-side direction of the image display region of the display element; and a polarization controller which aligns polarization directions of the two linearly polarized lights into a polarization direction that is parallel or perpendicular to the incidence plane of the at least one reflection surface and outputs resulting linearly polarized lights.

2. The image projection device of claim 1, wherein
the polarization controller comprises phase plates which are disposed at least one at an optical path of each of the two linearly polarized lights which result from the polarization separation performed by the polarization separation element.

3. The image projection device of claim 2, wherein
the phase plates include:
a first phase plate which is disposed at an optical path of one linearly polarized light of the two linearly polarized lights which result from the polarization separation performed by the polarization separation element; and
a second phase plate which is disposed at optical paths of both of the two linearly polarized lights;
the first phase plate converts the one linearly polarized light into a linearly polarized light having a same polarization direction as another linearly polarized light of the two linearly polarized lights; and
the second phase plate rotates the linearly polarized light which is incident thereon from the polarization separation element via the first phase plate and the other linearly polarized light which is incident thereon directly from the polarization separation element in a same direction such that a polarization direction is parallel or perpendicular to the incidence plane of the at least one reflection surface.

4. The image projection device of claim 2, wherein
the phase plates include:
a third phase plate which is disposed at an optical path of one linearly polarized light of the two linearly polarized lights which result from the polarization separation performed by the polarization separation element; and
a fourth phase plate which is disposed at an optical path of another linearly polarized light of the two linearly polarized lights;
the third phase plate rotates the one linearly polarized light into a linearly polarized light having a polarization direction that is parallel or perpendicular to the incidence plane of the at least one reflection surface; and
the fourth phase plate rotates the other linearly polarized light into a linearly polarized light having a same polarization direction as the linearly polarized light obtained by the third phase plate rotating the one linearly polarized light.

5. The image projection device of claim 2, wherein
the phase plates include:
a fifth phase plate which is disposed at an optical path of one linearly polarized light of the two linearly polarized lights which result from the polarization separation performed by the polarization separation element;

a sixth phase plate which is disposed at an optical path of another linearly polarized light of the two linearly polarized lights; and
a seventh phase plate which is disposed at optical paths of both of the two linearly polarized lights;
the fifth phase plate performs conversion of the one linearly polarized light into a circularly polarized light;
the sixth phase plate performs conversion of the other linearly polarized light into a circularly polarized light which has a same rotation direction as the circularly polarized light which results from the conversion performed by the fifth phase plate; and
the seventh phase plate converts the circularly polarized light which results from the conversion performed by the fifth phase plate into a first linearly polarized light and converts the circularly polarized light which results from the conversion performed by the sixth phase plate into a second linearly polarized light, the first and second linearly polarized lights having a same polarization direction which is parallel or perpendicular to the incidence plane of the at least one reflection surface.

6. The image projection device of claim 1, wherein
the polarization separation element is a plate on a front side of which a wire grid is formed by arranging metal wires to be equally spaced from each other, and on a back side of which a reflection surface is formed, and the polarization separation element reflecting linearly polarized light that is included in light incident on the wire grid and whose polarization direction is parallel to the wires to the polarization controller, the polarization separation element transmitting linearly polarized light that is included in the light incident on the wire grid and whose polarization direction is perpendicular to the wires such that the linearly polarized light is reflected by the reflection surface to the polarization controller.

7. The image projection device of claim 1, further comprising:
an integrator optical system which uniformizes a light amount distribution of light from the light source and forms an illumination light beam having a shape that is similar to a shape of the rectangular image display region of the digital micromirror device.

8. The image projection device of claim 1, further comprising:
a critical angle prism having a critical surface which totally reflects illumination light to the display element and transmits image light from the display element,
wherein
an incidence plane of the critical surface and incidence planes of the mirrors of the digital micromirror device are parallel to each other, and the at least one reflection surface includes the critical surface.

9. The image projection device of claim 8, wherein light that passes through the critical surface is P-polarized light.

10. The image projection device of claim 9, wherein the critical surface is a non-coated surface or a surface that is coated with a single-layer protection coat.

11. The image projection device of claim 8, wherein
three display elements are provided as the display element corresponding to three different colors;
the image projection device further comprises a color prism which is disposed at optical paths between the critical angle prism and the display elements such that the color prism separates light from the critical angle prism into light of the three different colors and direct the light of each of the three different colors to a corresponding one of the display elements, and such that the color prism combines light reflected from the display elements into a same optical path; and the rotation axes of the mirrors of the display elements are parallel to a plane that is parallel to a normal line of each of color separation surfaces of the color prism.

12. The image projection device of claim 11, further comprising:

a color selective polarization converter which converts a polarization direction of linearly polarized light that enters the color prism from the critical angle prism into a direction that is perpendicular to another polarization direction selectively according to wavelength, wherein the color prism has two color separation surfaces as the color separation surface;

the two color separation surfaces reflect light of colors which are different from each other while the two color separation surfaces each transmit light of a remaining color; and the color selective polarization converter directs light of a color that passes through both of the two color separation surfaces to be incident on the two color separation surfaces as substantially P-polarized light while the color selective color selective polarization converter directs light of a remaining color to be incident on the two color separation surfaces as substantially S-polarized light.

* * * * *